United States Patent
Asayama et al.

(10) Patent No.: US 10,789,502 B2
(45) Date of Patent: Sep. 29, 2020

(54) EXTRANEOUS-MATTER DETECTING APPARATUS AND EXTRANEOUS-MATTER DETECTING METHOD

(71) Applicant: DENSO TEN Limited, Kobe-shi, Hyogo (JP)

(72) Inventors: Nobunori Asayama, Kobe (JP); Daisuke Yamamoto, Kobe (JP); Nobuhisa Ikeda, Kobe (JP); Takashi Kono, Kobe (JP)

(73) Assignee: DENSO TEN Limited, Kobe (JP)

( * ) Notice: Subject to any disclaimer, the term of this patent is extended or adjusted under 35 U.S.C. 154(b) by 89 days.

(21) Appl. No.: 16/217,743

(22) Filed: Dec. 12, 2018

(65) Prior Publication Data
US 2019/0228254 A1    Jul. 25, 2019

(30) Foreign Application Priority Data

Jan. 24, 2018  (JP) ................. 2018-010057
Jan. 24, 2018  (JP) ................. 2018-010058
Jan. 30, 2018  (JP) ................. 2018-013947

(51) Int. Cl.
*G06K 9/62* (2006.01)
*G06K 9/46* (2006.01)
*G06K 9/00* (2006.01)

(52) U.S. Cl.
CPC ....... *G06K 9/4647* (2013.01); *G06K 9/00791* (2013.01); *G06K 9/4642* (2013.01)

(58) Field of Classification Search
CPC ... G06T 5/002; G06T 7/13; G06T 7/11; G06T 7/44; G06T 7/12;

(Continued)

(56) References Cited

U.S. PATENT DOCUMENTS

2016/0055645 A1*  2/2016  Ito ................... G06T 7/246
                                           382/103

FOREIGN PATENT DOCUMENTS

JP    2001-141838 A    5/2001
JP    2010-014494 A    1/2010

(Continued)

OTHER PUBLICATIONS

J.R. Saylor et al., "Edge detection methods applied to the analysis of spherical raindrop images", Applied Optics, vol. 46, No. 22, Aug. 1, 2007, pp. 5352-5367. (Year: 2007).*

*Primary Examiner* — Brian Werner
(74) *Attorney, Agent, or Firm* — Oliff PLC

(57) ABSTRACT

An extraneous-matter detecting apparatus according to an embodiment includes a first extraction unit, a second extraction unit, and a detection unit. The first extraction extracts a first pixel group of first pixels included in a captured image captured by an image capturing device. Each of the first pixels has a luminance gradient directed outward from a predetermined center region. The second extraction unit extracts a second pixel group of second pixels included in the captured image. Each of the second pixels has a luminance gradient directed inward toward the predetermined center region. The detection unit combines the first pixel group, extracted by the first extraction unit, and the second pixel group, extracted by the second extraction unit, with each other so as to detect an extraneous matter adhered to the image capturing device.

14 Claims, 28 Drawing Sheets

(58) Field of Classification Search
CPC ........... G06T 2207/30248–2207/30264; G06K 9/4642; G06K 9/00791–9/00825; G06K 2009/485

See application file for complete search history.

(56) References Cited

FOREIGN PATENT DOCUMENTS

| | | |
|---|---|---|
| JP | 2014-007686 A | 1/2014 |
| JP | 2015-070566 A | 4/2015 |
| WO | 2014/017523 A1 | 1/2014 |
| WO | 2014/083816 A1 | 6/2014 |

\* cited by examiner

A B C D E F

| a | A A A B B C C D D E E F F F |

| b | A A A B B C C D E F F F F F F F F F F |

3 TIMES     10 TIMES

| c | A A A B B C C D E F F F   F F F F F F |

3 TIMES    3 TIMES    REMOVE a b c d

| DETECTION AREA ID | AREA INFORMATION | SCORE | STATE | EASE | ... |
|---|---|---|---|---|---|
| xx1 | (x1, y1), w1, h1... | s1 | IDLE | ☐ | ... |
| xx2 | (x2, y2), w2, h2... | s2 | LATENCY | ☑ | ... |
| xx3 | (x3, y3), w3, h3... | s3 | OBSERVATION | ☐ | ... |
| xx4 | (x4, y4), w4, h4... | s4 | PENALTY | ☐ | ... |
| ⋮ | ⋮ | ⋮ | ⋮ | ⋮ | ⋮ |

| IDLE | UNDETECTED STATE |
|---|---|
| LATENCY | THERE PRESENTS POSSIBILITY THAT EXTRANEOUS MATTER ADHERES |
| OBSERVATION | OBSERVATION STATE AFTER REMOVAL PROCESS |
| PENALTY | STATE WHERE EXTRANEOUS MATTER HAS BEEN CONTINUOUSLY DETECTED IN CORRESPONDING AREA AFTER REMOVAL PROCESS | though
EXTRANEOUS-MATTER DETECTING APPARATUS AND EXTRANEOUS-MATTER DETECTING METHOD

CROSS-REFERENCE TO RELATED APPLICATION

This application is based upon and claims the benefit of priority of the prior Japanese Patent Applications No. 2018-010057 and No. 2018-010058, both filed on Jan. 24, 2018 and Japanese Patent Application No. 2018-013947, filed on Jan. 30, 2018, the entire contents of which are incorporated herein by reference.

FIELD

The embodiments discussed herein are directed to an extraneous-matter detecting apparatus and an extraneous-matter detecting method.

BACKGROUND

Conventionally, there has been known an extraneous-matter detecting apparatus that detects an extraneous matter, adhered to a lens of a camera provided in a vehicle, for example, by using a camera image captured by this camera (see Japanese Laid-open Patent Publication No. 2010-014494, for example).

However, when a water droplet is going to be detected as an extraneous matter by using the conventional technology, a water droplet is not able to be detected depending on a background image etc. of the water droplet, and thus the above-mentioned conventional technology has room for improvement in reducing detection failure of an extraneous matter.

SUMMARY

An extraneous-matter detecting apparatus according to an embodiment includes a first extraction unit, a second extraction unit, and a detection unit. The first extraction extracts a first pixel group of first pixels included in a captured image captured by an image capturing device. Each of the first pixels has a luminance gradient directed outward from a predetermined center region. The second extraction unit extracts a second pixel group of second pixels included in the captured image. Each of the second pixels has a luminance gradient directed inward toward the predetermined center region. The detection unit combines the first pixel group, extracted by the first extraction unit, and the second pixel group, extracted by the second extraction unit, with each other so as to detect an extraneous matter adhered to the image capturing device.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF EMBODIMENTS

Hereinafter, embodiments of an extraneous-matter detecting apparatus and an extraneous-matter detecting method according to the present application will be described in detail with reference to the accompanying drawings. The present disclosure is not limited to the embodiments described in the following.

First Embodiment

Figure 1A:
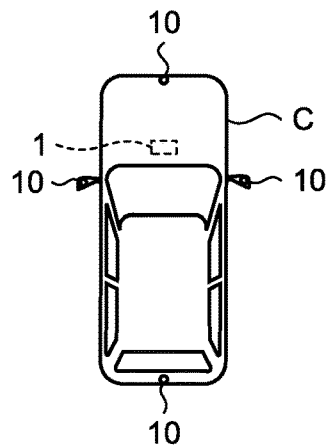
FIG. 1A is a diagram illustrating a mounted example of an extraneous-matter detecting apparatus according to a first embodiment.
Figure 1B:
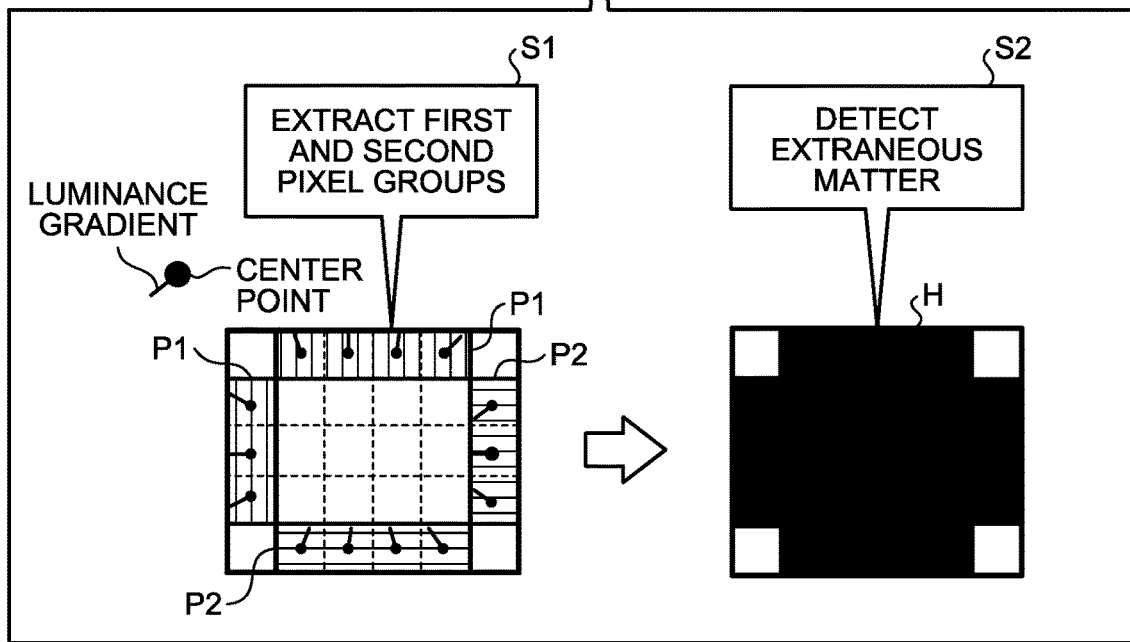
FIG. 1B is a diagram illustrating the outline of an extraneous-matter detecting method.

The outline of an extraneous-matter detecting apparatus and an extraneous-matter detecting method according to a first embodiment will be explained with reference to FIGS. 1A and 1B. FIG. 1A is a diagram illustrating a mounted example of an extraneous-matter detecting apparatus according to the first embodiment. FIG. 1B is a diagram illustrating the outline of an extraneous-matter detecting method according to the first embodiment.

As illustrated in FIG. 1A, an extraneous-matter detecting apparatus 1 is provided in a vehicle C. The extraneous-matter detecting apparatus 1 detects an extraneous matter H, adhered to a lens (not illustrated) of a camera 10, from a camera image I captured by the camera 10 that is an image capturing device provided in the vehicle C.

The camera image I, captured by each of the cameras 10, is used in various kinds of sensing that is for white-line detection and/or autonomous driving of the vehicle C, for example. In the example illustrated in FIGS. 1A and 1B, a case is exemplified in which the vehicle C includes the four cameras 10 that capture images in respective directions that are different from one another.

Each of the cameras 10 is arranged outside of the vehicle C, and thus there presents possibility that the extraneous matter H, such as a water droplet and dust, adheres to a lens of the camera 10.

When detecting a water droplet as an extraneous matter, a conventional technology has detected, from a camera image, a water droplet on the basis of a region in which the brightness increases (or decreases) from the center to an outer periphery of the water droplet in the camera image.

However, in some cases, the conventional technology is not able to detect a water droplet depending on a background image etc. of this water droplet, for example.

Specifically, as illustrated in FIG. 1B by using the camera image I, for example, when a background of a water droplet W includes a stop line or the like, there presents a case where a region, in which the brightness increases from the center toward an outer periphery of the region, and a region, in which the brightness decreases from the center toward an outer periphery of the region, are mixed. Therefore, the conventional technology is not able to detect this water droplet, and thus there presents possibility of detection failure of the water droplet.

Thus, the extraneous-matter detecting method according to the embodiment is configured to: individually extract, from the camera image I, a region, in which the brightness increases toward an outer periphery of the region, and a region, in which the brightness decreases toward an outer periphery of the region; and combine both of the regions with each other, so as to detect the water droplet W.

Specifically, as illustrated in FIG. 1B, the extraneous-matter detecting method according to the embodiment extracts first pixel group P1 and second pixel group P2 among from pixels included in the camera image I (Step S1). In FIG. 1B, a center point of each pixel is indicated by using a black circle, and a direction of a line extending from the center point indicates a corresponding luminance gradient.

For example, the first pixel group P1 is a set of pixels, each having a luminance gradient directed outward from a predetermined center region; and the second pixel group P2 is a set of pixels, each having a luminance gradient directed inward toward the above-mentioned center region.

In other words, the extraneous-matter detecting method according to the present embodiment extracts, as the first pixel group P1, a feature of the water droplet W in which the brightness increases from the center to an outer periphery of the water droplet W; and further extracts, as the second pixel group P2, a feature of the water droplet W in which the brightness increases inward toward the center of the water droplet W.

Subsequently, the extraneous-matter detecting method according to the embodiment detects the extraneous matter H on the basis of a combination of the first pixel group P1 and the second pixel group P2 (Step S2). For example, the extraneous-matter detecting method detects, as the extraneous matter H, a region, surrounded by the first pixel group P1 and the second pixel group P2, in the camera image I.

In other words, the extraneous-matter detecting method combines the feature of the water droplet W in which the brightness increases from the center toward an outer periphery of the water droplet W with the feature of the water droplet W in which the brightness increases inward toward the center of the water droplet W so as to detect the one water droplet W.

Thus, it is possible to detect the water droplet W even when the one water droplet W mixedly includes a region, in which the brightness increases from the center toward an outer periphery of the water droplet W, and a region in which the brightness decreases from the center toward an outer periphery of the water droplet W.

The extraneous-matter detecting method according to the embodiment is also capable of detecting, as the water droplet W in which the luminance increases (or decreases) from the center toward an outer periphery of the water droplet W, a region that is surrounded by the first pixel group P1 (or second pixel group P2).

Therefore, by employing the extraneous-matter detecting method according to the embodiment, it is possible to reduce detection failure of the extraneous matter H.

Figure 2:
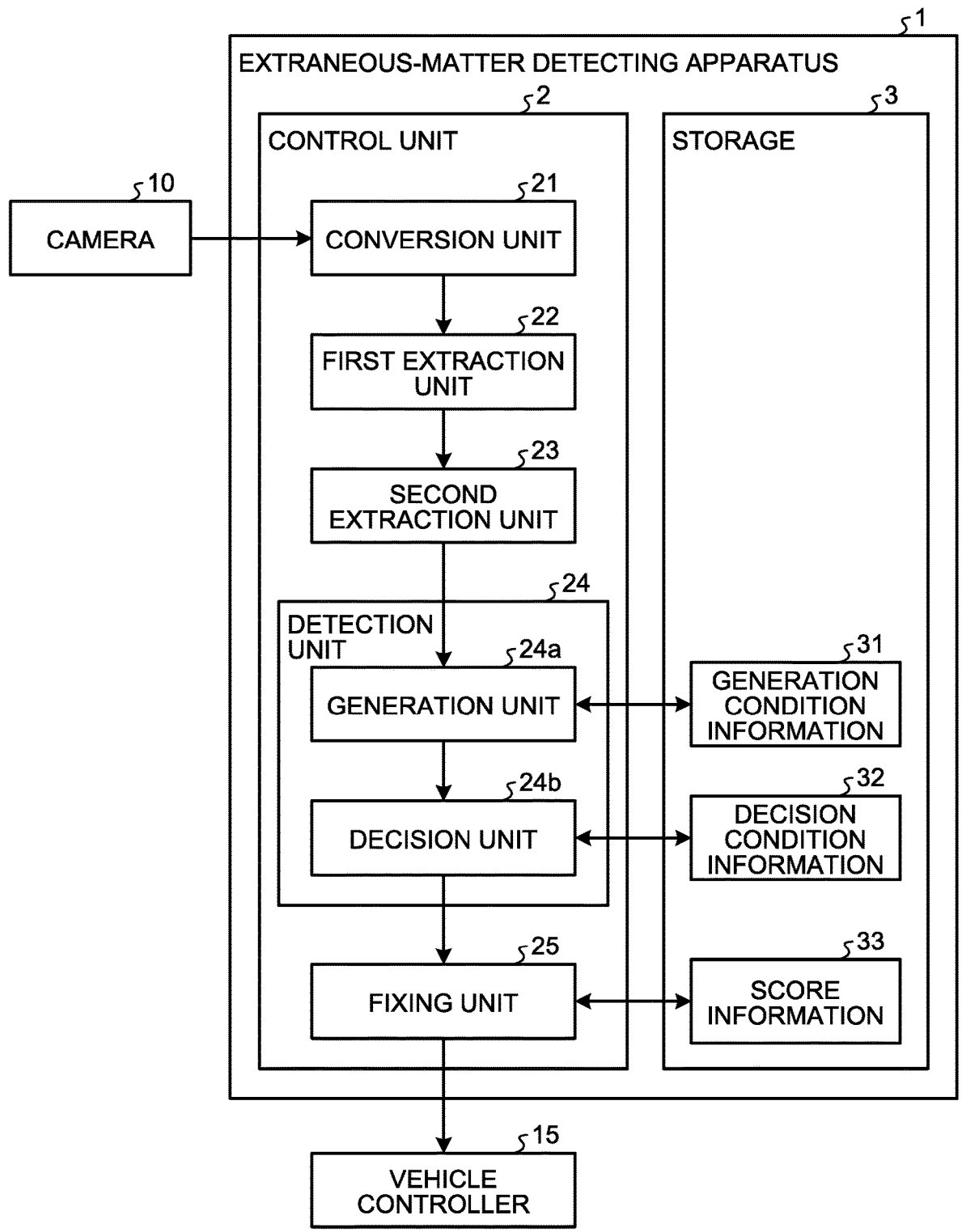
FIG. 2 is a block diagram illustrating the extraneous-matter detecting apparatus.

Next, a configuration of the extraneous-matter detecting apparatus 1 according to the embodiment will be explained with reference to FIG. 2. FIG. 2 is a block diagram illustrating the extraneous-matter detecting apparatus 1. In FIG. 2, the camera 10 and a vehicle controller 15 are illustrated in addition to the extraneous-matter detecting apparatus 1.

The camera 10 includes image capturing elements, such as a Charge Coupled Device (CCD) and a Complementary Metal Oxide Semiconductor (CMOS), so as to capture the outside of the vehicle C. The camera image I, captured by the camera 10, is output to the extraneous-matter detecting apparatus 1.

The vehicle controller 15 performs, on the vehicle C, vehicle control including autonomous driving, automatic parking control, and drive assistance such as a Pre-crash Safety System (PCS) and an Advanced Emergency Braking System (AEB). The vehicle controller 15 may be separately configured from an automatic parking control unit that performs the automatic parking control.

For example, the vehicle controller 15 is capable of detecting an obstacle and/or a white line from the camera image I that is input via the extraneous-matter detecting apparatus 1 to perform the above-mentioned vehicle control on the basis of the detection result.

The extraneous-matter detecting apparatus 1 includes a control unit 2 and a storage 3. The control unit 2 includes a conversion unit 21, a first extraction unit 22, a second extraction unit 23, a detection unit 24, and a fixing unit 25. The control unit 2 includes: a computer including, for example, a Central Processing Unit (CPU), a Read Only Memory (ROM), a Random Access Memory (RAM), a Hard Disk Drive (HDD), and an input/output port; and various circuits.

For example, the CPU of the computer reads and executes a program stored in the ROM so as to function as any of the conversion unit 21, the first extraction unit 22, the second extraction unit 23, the detection unit 24, and the fixing unit 25 of the control unit 2.

Moreover, all or a part of the conversion unit 21, the first extraction unit 22, the second extraction unit 23, the detection unit 24, and the fixing unit 25 of the control unit 2 may be constituted of hardware such as an Application Specific Integrated Circuit (ASIC) and a Field Programmable Gate Array (FPGA).

The storage 3 corresponds to the RAM and/or the HDD, for example. The RAM and the HDD are capable of storing therein generation condition information 31, decision condition information 32, score information 33, and information on various programs. The extraneous-matter detecting apparatus 1 may acquire the above-mentioned programs and various kinds of information via another computer, connected to the extraneous-matter detecting apparatus 1, via a wired/wireless network or a portable recording medium.

The conversion unit 21 of the control unit 2 converts each pixel included in the camera image I into a code corresponding to a luminance gradient of the corresponding pixel. The conversion unit 21 executes a grayscale process on the camera image I, input from the camera 10, to convert the camera image I into a gray-scaled image. The grayscale process is a process for expressing, by using a tone between white and black, each pixel in the camera image I in accordance with a luminance of the corresponding pixel.

Subsequently, the conversion unit 21 applies a Sobel filter to the gray-scaled image so as to extract edge intensities of each pixel in an X-axis direction and a Y-axis direction. Next, the conversion unit 21 computes, for each pixel, a luminance gradient by using the edge intensities so as to convert each pixel into a corresponding code.

Figure 3A:
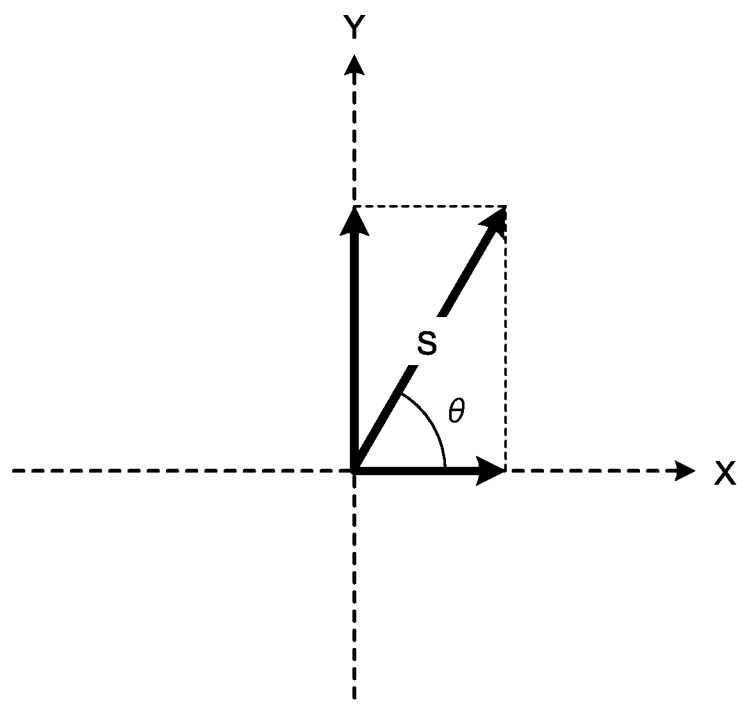
FIGS. 3A to 3C are diagrams illustrating specific examples of processes to be executed by a conversion unit.
Figure 3B:
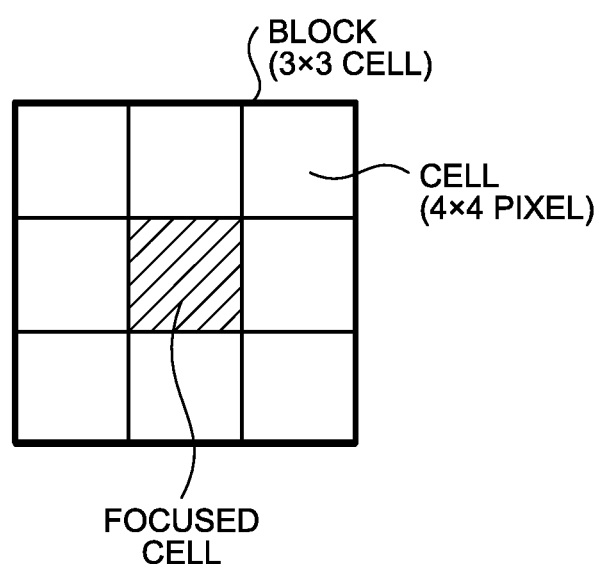
Figure 3C:
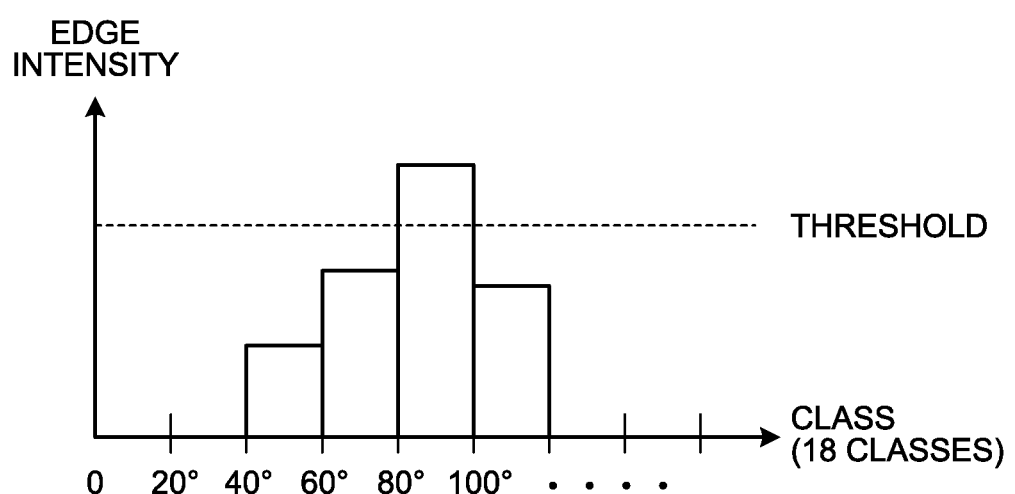

FIGS. 3A to 3C are diagrams illustrating specific examples of processes to be executed by the conversion unit 21. In FIG. 3A, edge intensities in the X-axis direction and the Y-axis direction are illustrated. The conversion unit 21 computes, for each pixel, an actual edge intensity S and an edge direction θ by using the edge intensity in the X-axis direction and that in the Y-axis direction.

As illustrated in FIG. 3A, a diagonal line of a rectangle, having two sides of an edge intensity in the X-axis direction and that in the Y-axis direction, becomes the edge intensity S, and an angle between this diagonal line and the X-axis becomes the edge direction θ. This edge direction θ is a luminance gradient (angle direction).

The conversion unit 21 according to the present embodiment integrates a plurality of pixels to compute the luminance gradient. In other words, the conversion unit 21 divides the camera image I into a plurality of regions, and converts each of the regions into a code corresponding to a luminance gradient of the corresponding region.

FIG. 3B is a diagram illustrating a specific example of pixels to be integrated. The conversion unit 21 computes, for each block illustrated in FIG. 3B, a luminance gradient of a focused cell that is located at the center of the corresponding block. The above-mentioned block means a set of pixels that has 3-by-3 matrix cells, and the above-mentioned cell means a set of 4-by-4 matrix pixels, for example.

In other words, in the example illustrated in FIG. 3B, one block is a set of 12-by-12 matrix cells. The conversion unit 21 computes, for each block, a representative value of a luminance gradient of a focused cell. Specifically, as illustrated in FIG. 3C, the conversion unit 21 generates, for each block, a histogram; and computes a representative value of a focused cell on the basis of this histogram.

Specifically, as illustrated in FIG. 3C, the conversion unit 21 classifies the luminance gradient into a plurality of classes at predetermined intervals, and adds an edge intensity of each pixel included in a block to a class according to a luminance gradient of the corresponding pixel. In the example illustrated in FIG. 3C, a case is exemplified in which the class is classified per 20 degrees.

The conversion unit 21 computes, as a luminance gradient of the focused cell, a class having the highest sum of the edge intensities. In this case, when this sum is equal to or more than a threshold, the conversion unit 21 decides this class as a representative value. In other words, the representative value is not assigned to a focused cell whose sum is equal to or less than the threshold.

In other words, when edge intensities of pixels included in a block are low, or when luminance gradients of these pixels are dispersed, a representative value is not assigned to a focused cell of this block.

The conversion unit 21 computes a representative value of a focused cell, shifts the block by one cell to set another focused cell, and computes a representative value of this focused cell. Thus, the conversion unit 21 computes a representative value of each of the cells.

The conversion unit 21 converts each of the cells into a code of a class according to a corresponding representative value. Thus, in the encoded camera image I, codes are arrayed in a grid. This camera image I is output to the first extraction unit 22.

Returning to FIG. 2, the first extraction unit 22 will be explained. The first extraction unit 22 extracts the first pixel group P1 of pixels, included in the camera image I, having luminance gradients directed outward from a predetermined center region. The second extraction unit 23 extracts the second pixel group P2 of pixels having luminance gradients directed inward toward the above-mentioned center region.

The first extraction unit 22 extracts, as the first pixel group P1, a code array satisfying a predetermined arrangement order, from the camera image I that has been encoded by the conversion unit 21 in accordance with luminance gradient. The second extraction unit 23 extracts, as the second pixel group P2, a code array satisfying a predetermined arrangement order, from the camera image I that has been encoded by the conversion unit 21 in accordance with luminance gradient.

Figure 4A:
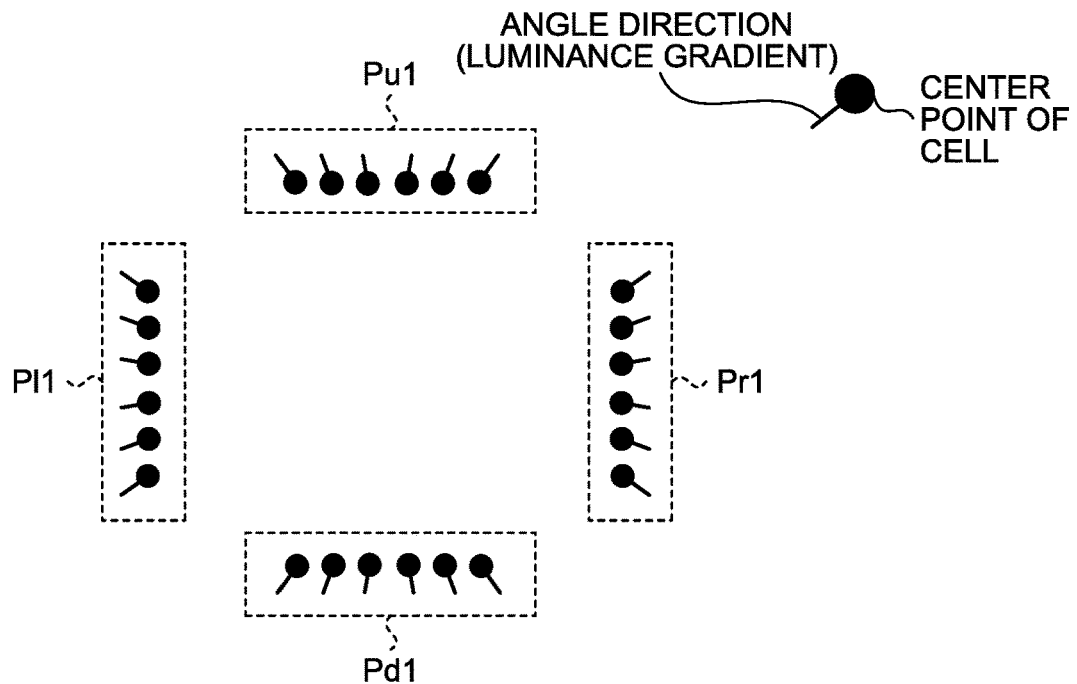
FIG. 4A is a diagram illustrating a specific example of a first pixel group.
Figure 4B:
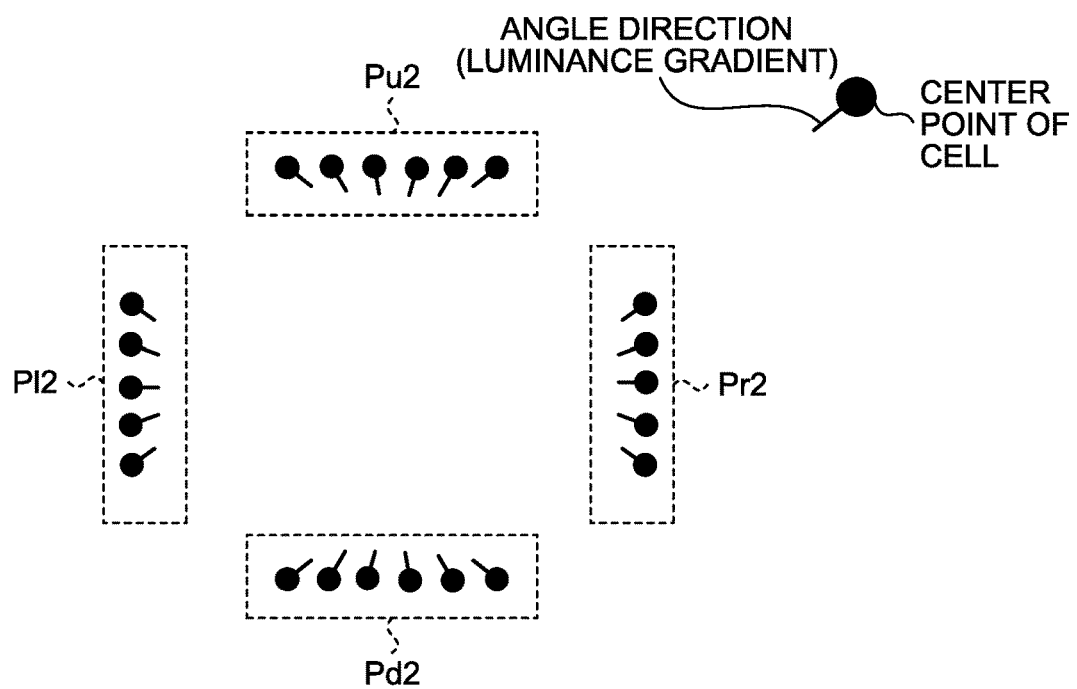
FIG. 4B is a diagram illustrating a specific example of a second pixel group.
Figure 4C:
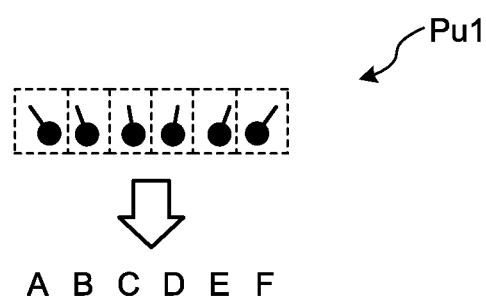
FIG. 4C is a diagram illustrating a specific example of an arrangement order of the first pixel group.

Specific examples of processes to be executed by the first extraction unit 22 and the second extraction unit 23 will be explained with reference to FIGS. 4A to 4C. FIG. 4A is a diagram illustrating a specific examples of the first pixel group P1. FIG. 4B is a diagram illustrating a specific example of the second pixel group P2. FIG. 4C is a diagram illustrating a specific example of an arrangement order of the first pixel group P1.

The first pixel group P1 and the second pixel group P2 will be explained with reference to FIGS. 4A and 4B. In FIGS. 4A and 4B, for convenience of visual understanding, an actual edge direction (luminance gradient) is schematically illustrated instead of a code.

The first extraction unit 22 extracts from the camera image I, as the first pixel group P1, a code array that satisfies an arrangement order of any one of an upper-side pattern Pu1, a lower-side pattern Pd1, a left-side pattern Pl1, and a right-side pattern Pr1.

The upper-side pattern Pu1 indicates an arrangement order of a code array corresponding to an upper part of a water droplet whose brightness increases from its center toward its end part. The lower-side pattern Pd1 indicates an arrangement order of a code array corresponding to a lower part of the above-mentioned water droplet. The left-side pattern Pl1 indicates an arrangement order of a code array corresponding to a left side of the above-mentioned water droplet. The right-side pattern Pr1 indicates an arrangement order of a code array corresponding to a right side of the above-mentioned water droplet.

On the other hand, as illustrated in FIG. 4B, the second extraction unit 23 extracts from the camera image I, as the second pixel group P2, a code array that satisfies an arrangement order of any one of an upper-side pattern Pu2, a lower-side pattern Pd2, a left-side pattern Pl2, and a right-side pattern Pr2.

The upper-side pattern Pu2 indicates an arrangement order of a code array corresponding to an upper part of a water droplet whose brightness decreases from its center toward its end part. The lower-side pattern Pd2 indicates an arrangement order of a code array corresponding to a lower part of the above-mentioned water droplet. The left-side pattern Pl2 indicates an arrangement order of a code array corresponding to a left side of the above-mentioned water droplet. The right-side pattern Pr2 indicates an arrangement order of a code array corresponding to a right side of the above-mentioned water droplet.

As described above, the first extraction unit 22 extracts, as the first pixel group P1, a pixel group having a feature of a water droplet whose brightness increases from its center toward its end part, and the second extraction unit 23 extracts, as the second pixel group P2, a pixel group having a feature of the water droplet whose brightness decreases from its center toward its end part.

Lengths of code arrays of the first pixel group P1 and the second pixel group P2 change in accordance with the size of a water droplet. For example, a length of a code array on each side of a small water droplet is shorter than that of a large water droplet.

Thus, when the above-mentioned arrangement orders are satisfied, the first extraction unit 22 and the second extraction unit 23 extract the first pixel group P1 and the second pixel group P2 while tolerating repetition of a code.

Specifically, as illustrated in FIG. 4C, when indicating the upper-side pattern Pu1 of the first pixel group P1 by using a code array ("A to F"), as illustrated in "a" of FIG. 4C, repetition of each kind of code is tolerated when the codes are arrayed in an order of "A to F".

In other words, when an arrangement order, for example, a code "A" or "B" is right adjacent to a code "A", or a code "B" or "C" is right adjacent to a code "B" is satisfied, the first extraction unit 22 is capable of extracting the codes as the upper-side pattern Pu1.

Thus, it is possible to extract an arbitrary-sized water droplet by executing one extraction process. Therefore, the extraneous-matter detecting apparatus 1 according to the embodiment is capable of extracting a plurality of water droplets, having different sizes, by executing one extraction process, so that it is possible to reduce detection failure of a water droplet while reducing the processing load.

A shape of a water droplet is commonly spherical, and thus the numbers of repetitions of codes are to be line symmetrical with respect to a line passing through the center of the water droplet. Thus, the extraneous-matter detecting apparatus 1 according to the embodiment may remove a code array having a low symmetrical balance among from code arrays that satisfy the arrangement order.

As illustrated in "b" of FIG. 4C, the balance between, for example, "A"s and "F"s located at both ends are checked in detail. In "b" of FIG. 4C, the case is exemplified in which "A" is repeated three times and "F" is repeated ten times.

In this case, in a case where the number of "A"s of a code array is equal to or less than half of the number of "F"s or at least two times larger than the number of "F"s, the extraneous-matter detecting apparatus 1 removes the code array even when this code array satisfies the arrangement order. Thus, it is possible to improve detection accuracy of a water droplet. In other words, it is possible to prevent the extraneous-matter detecting apparatus 1 from detecting an object other than a water droplet as a water droplet.

As illustrated in "c" of FIG. 4C, the extraneous-matter detecting apparatus 1 may extract a code array so that a balance of codes of this code array is even. Specifically, the extraneous-matter detecting apparatus 1 may detect, as a feature of a water droplet, only three "F"s from the center of the code array, and further may extract the three "F"s while removing the forth and the subsequent "F"s. In the above description, the upper-side pattern Pu1 is exemplified; however, other patterns are also similar.

Returning to FIG. 2, the detection unit 24 will be explained. The detection unit 24 detects one extraneous matter on the basis of a combination of the first pixel group P1, extracted by the first extraction unit 22, and the second pixel group P2 extracted by the second extraction unit 23.

The detection unit 24 includes a generation unit 24a and a decision unit 24b. The generation unit 24a integrates a first region, extending from the first pixel group P1 toward a center region, and a second region, extending from the second pixel group P2 toward the center region, so as to generate an integrated region.

The decision unit 24b decides, as an extraneous matter, the integrated region on the basis of the combination of the first pixel group P1 and the second pixel group P2 that constitute this integrated region generated by the generation unit 24a.

As described above, the detection unit 24 is capable of detecting a water droplet having a feature of any one or both of a water droplet whose brightness increases from its center toward its end part and a water droplet whose brightness decreases from its center toward its end part.

In the present embodiment, a water droplet, constituted of only the first pixel group P1, is a water droplet whose brightness increases from its center toward its end part; and a water droplet, constituted of only the second pixel group P2, is a water droplet whose brightness decreases from its center toward its end part.

A water droplet, constituted of the first pixel group P1 and the second pixel group P2, is a water droplet having features of both of a water droplet, whose brightness increases from its center toward its end part, and a water droplet whose brightness decreases from its center toward its end part.

When detecting a water droplet that includes both of the first pixel group P1 and the second pixel group P2, the detection unit 24 makes a detection condition tighter than a case of detecting a water droplet constituted of one of the first pixel group P1 and the second pixel group P2. In other words, when a water droplet includes both of the first pixel group P1 and the second pixel group P2, the detection unit 24 makes a detection condition tighter than a case when a water droplet is constituted of only the first pixel group P1 and a water droplet is constituted of only the second pixel group P2.

This is because possibility of an erroneous detection, in other words, possibility of erroneously detecting an object other than a water droplet as a water droplet is higher when a water droplet includes both of the first pixel group P1 and the second pixel group P2 than when a water droplet is constituted of only the first pixel group P1 and a water droplet is constituted of only the second pixel group P2.

Specifically, a generation condition of the integrated region, which is to be used by the generation unit 24a, and a decision condition of a water droplet, which is to be used by the decision unit 24b, are made rather tighter so as to reduce the above-mentioned erroneous detection. The generation condition is stored in the storage 3 as the generation condition information 31, and the decision condition is stored in the storage 3 as the decision condition information 32.

Figure 5A:
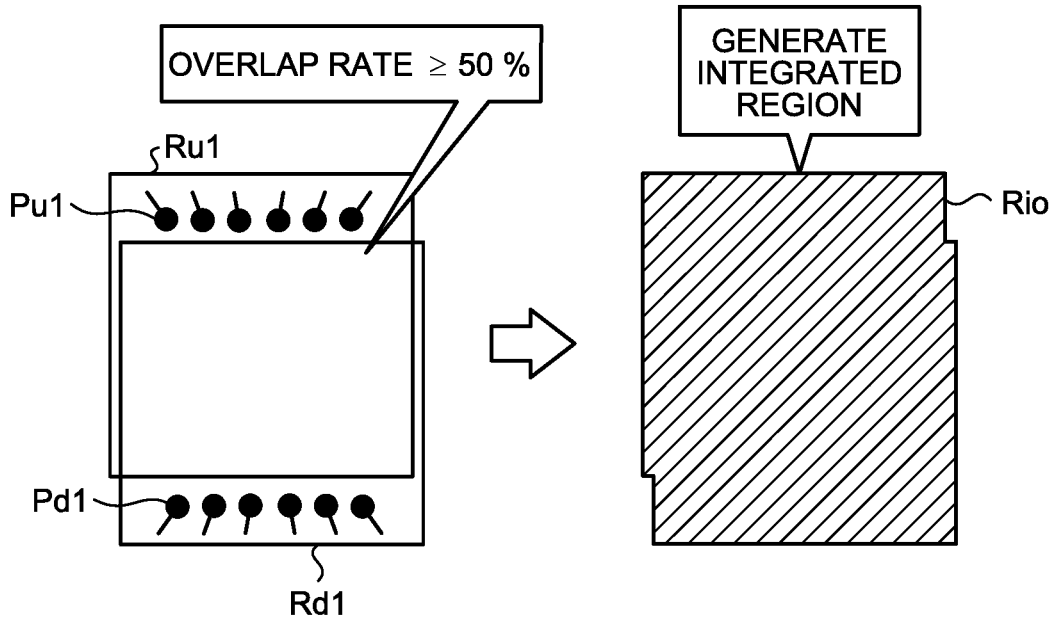
FIGS. 5A and 5B are diagrams illustrating specific examples of processes to be executed by a generation unit.
Figure 5B:
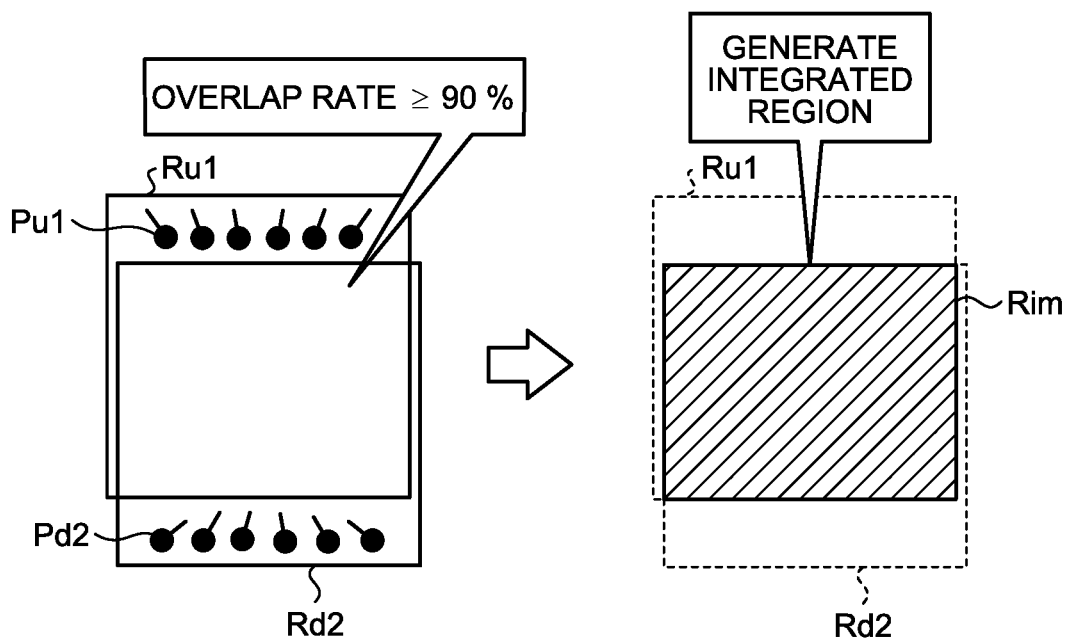

FIGS. 5A and 5B are diagrams illustrating specific examples of processes to be executed by the generation unit 24a. An integrated region Ri that is based on the first pixel group P1 will be explained with reference to FIG. 5A.

As illustrated in FIG. 5A, the generation unit 24a integrates a first region Ru1, corresponding to the upper-side pattern Pu1 of the first pixel group P1, and a first region Rd1, corresponding to the lower-side pattern Pd1 of the first pixel group P1, to generate a single region Rio that is the integrated region Ri.

The first region Ru1 is a square-shaped region obtained by extending one side, having a length of the upper-side pattern Pu1, from the upper-side pattern Pu1 toward the center (downward in FIG. 5A) of the square-shaped region, and the first region Rd1 is a square-shaped region obtained by extending one side, having a length of the lower-side pattern Pd1, from the lower-side pattern Pd1 toward the center (upward in FIG. 5A) of the square-shaped region.

In this case, an integration condition of the single region Rio, which is to be used by the generation unit 24a, is that an overlap rate between the first region Ru1 and the first region Rd1 is equal to or more than 50%. As illustrated in FIG. 5A, the single region Rio is a region that includes both of the first region Ru1 and a first region Rd1. In other words, the single region Rio is a logical disjunction between the first region Ru1 and the first region Rd1.

On the other hand, as illustrated in FIG. 5B, an integration condition of a mixed region Rim that is the integrated region Ri including both of the first pixel group P1 and the second pixel group P2 is made tighter than that of the single region Rio.

Specifically, an integration condition of the mixed region Rim is that an overlap rate between the first region Ru1, corresponding to the upper-side pattern Pu1 of the first pixel group P1, and a second region Rd2, corresponding to the lower-side pattern Pd2 of the second pixel group P2, is equal to or more than 90%.

As illustrated in FIG. 5B, the generation unit 24a generates, as the mixed region Rim, an overlapped region between the first region Ru1 and the second region Rd2. In other words, the mixed region Rim is a logical conjunction between the first region Ru1 and the second region Rd2.

Figure 6A:
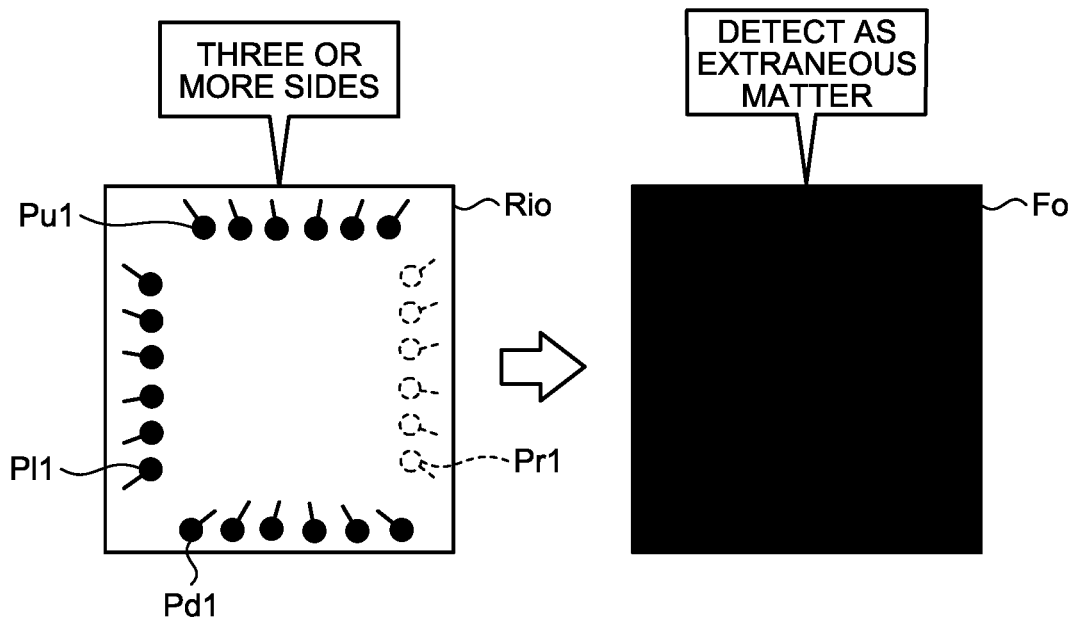
FIGS. 6A and 6B are diagrams illustrating specific examples of processes to be executed by a decision unit.
Figure 6B:
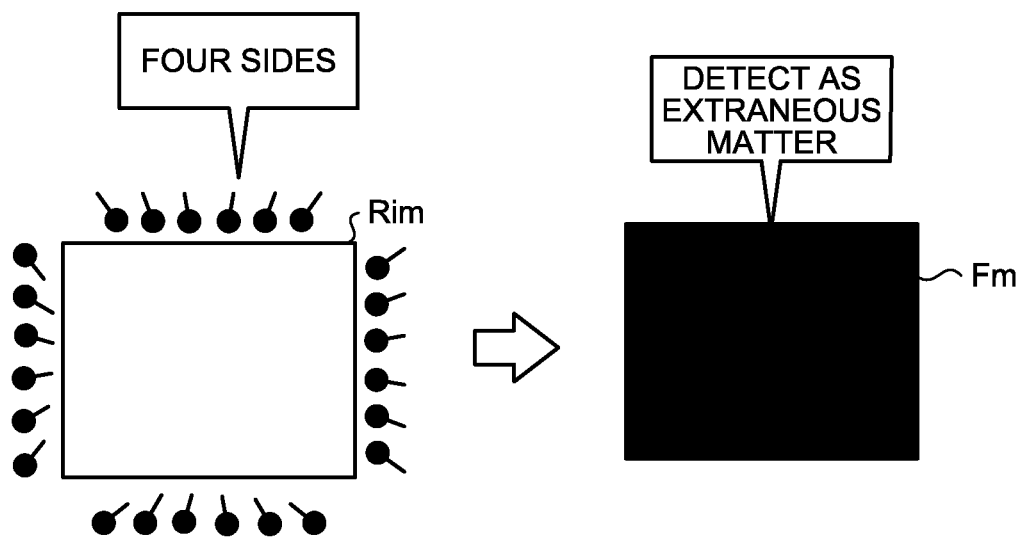

Next, specific examples of processes to be executed by the decision unit 24b will be explained with reference to FIGS. 6A and 6B. FIGS. 6A and 6B are diagrams illustrating specific examples of processes to be executed by the decision unit 24b.

A decision condition when an extraneous matter is decided to present in the single region Rio will be explained with reference to FIG. 6A. As illustrated in FIG. 6A, for example, when the single region Rio includes patterns of three or more sides, the decision unit 24b decides this single region Rio as an extraneous-matter region Fo to which an extraneous matter adheres.

When presence of the upper-side pattern Pu1 in an upper-side part is defined as a first condition, presence of the lower-side pattern Pd1 in a lower-side part is defined as a second condition, presence of the left-side pattern Pl1 in a left-side part is defined as a third condition, and presence of the right-side pattern Pr1 in a right-side part is defined as a fourth condition; a decision condition of the single region Rio is to satisfy at least three of the first to fourth conditions.

On the other hand, as illustrated in FIG. 6B, with respect to the mixed region Rim, a decision condition of an extraneous-matter region Fm, to be used by the decision unit 24b, is that patterns of sides enclosing therein the mixed region Rim is four.

In other words, the decision unit 24b decides, as the extraneous-matter region Fm, the mixed region Rim that satisfies the following four conditions. The first condition is that one of the upper-side patterns Pu1 and Pu2 presents in an upper-side part of the region. The second condition is that one of the lower-side patterns Pd1 and Pd2 presents in a lower-side part of the region. The third condition is that one of the left-side patterns Pl1 and Pl2 presents in a left-side part of the region. The fourth condition is that one of the right-side patterns Pr1 and Pr2 presents in a right-side part of the region.

The extraneous-matter region Fo is a region that is constituted of any one of the first pixel group P1 and the second pixel group P2, and the extraneous-matter region Fm is a region that is constituted of a combination of the first pixel group P1 and the second pixel group P2.

As described above, the generation unit 24a makes an integration condition of the mixed region Rim tighter than a mixing condition of the single region Rio, so that it is possible to prevent the decision unit 24b from erroneously detecting a water droplet in the mixed region Rim.

Furthermore, the decision unit 24b makes a decision condition of the extraneous-matter region Fm in the mixed region Rim tighter than that of the extraneous-matter region Fo in the single region Rio on, so that it is possible to reduce erroneous detection of a water droplet.

As described above, when a water droplet includes both of the first pixel group P1 and the second pixel group P2, the detection unit 24 makes a detection condition tighter than a detection condition when a water droplet is constituted of only one of the first pixel group P1 and the second pixel group P2, so as to detect a water droplet.

Thus, by employing the extraneous-matter detecting apparatus 1 according to the embodiment, it is possible to reduce detection failure of a water droplet while reducing erroneous detection of a water droplet.

Furthermore, the extraneous-matter detecting apparatus 1 according to the embodiment captures, not a profile of a circle-shaped water droplet, but features of sides of a rectangle enclosed in the water droplet to detect the water droplet. Thus, it is possible to detect a water droplet having, not limited to a perfect circular shape or an elliptical shape, an arbitrary shape by executing one process.

Returning to FIG. 2, the fixing unit 25 will be explained. The fixing unit 25 fixes a presence of each of the extraneous-matter regions Fo and Fm on the basis of a time-dependent overlap of the integrated region Ri that is decided by the decision unit 24b as corresponding one of the extraneous-matter regions Fo and Fm.

Figure 7:
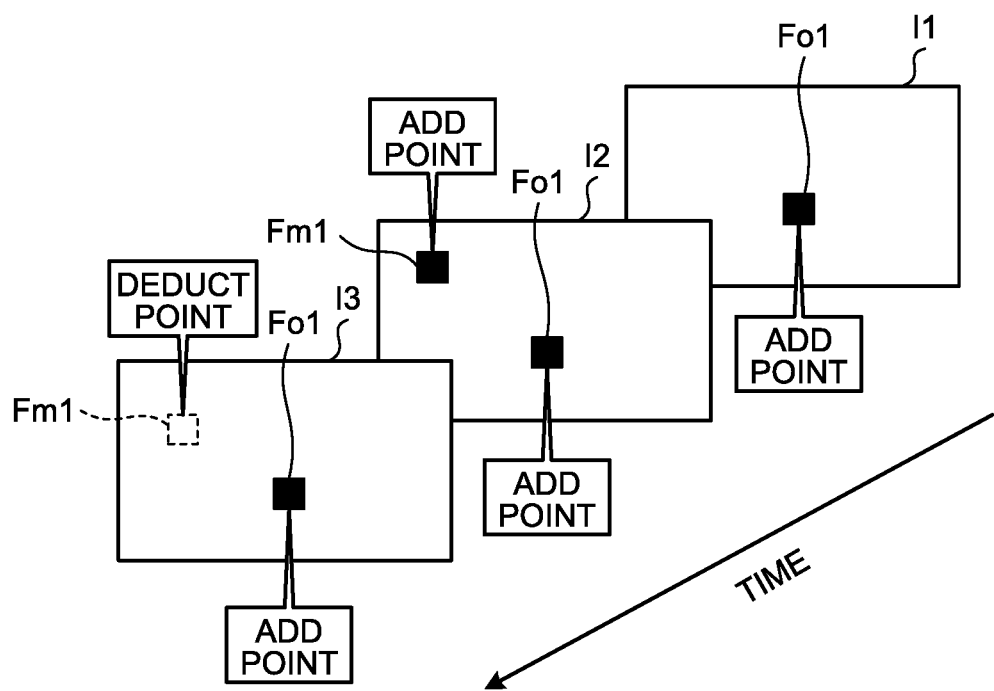
FIG. 7 is a diagram illustrating a specific example of a process to be executed by a fixing unit.

FIG. 7 is a diagram illustrating a specific example of a process to be executed by the fixing unit 25. As illustrated in FIG. 7, the fixing unit 25 adds a point to a region detected as the extraneous-matter region Fo or the extraneous-matter region Fm, and deducts a point from a region not detected as the extraneous-matter region Fo or the extraneous-matter region Fm.

The fixing unit 25 fixes, for an extraneous-matter region, a region whose cumulative value is equal to or more than a threshold. In other words, a region, continuously detected as the extraneous-matter region Fm or the extraneous-matter region Fo, is fixed for an extraneous-matter region.

As described above, the fixing unit 25 fixes an extraneous-matter region on the basis of the plurality of time-dependent continuous camera images I to be able to improve detection accuracy of the extraneous-matter region. In other words, the fixing unit 25 does not fix an extraneous-matter region by using only the one camera image I, so that it is possible to reduce erroneous detection of an extraneous matter.

The fixing unit 25 reduces weighting that is used for the extraneous-matter region Fm, constituted of a combination of the first pixel group P1 and the second pixel group P2, and uses the reduced weighting for the extraneous-matter region Fo, constituted of one of the first pixel group P1 and the second pixel group P2, so as to fix an extraneous-matter region.

Specifically, the fixing unit 25 sets points of the extraneous-matter region Fm to be lower than those of the extraneous-matter region Fo, so as to fix an extraneous-matter region. For example, in a case where the extraneous-matter region Fo is fixed for an extraneous-matter region when being detected five times, the extraneous-matter region Fm is fixed for an extraneous-matter region when being detected 10 times.

As described above, the fixing unit 25 changes weighting between the extraneous-matter region Fo and the extraneous-matter region Fm to fix an extraneous-matter region, so that it is possible to reduce erroneous detection due to the extraneous-matter region Fm. The weighting for the extraneous-matter region Fo and that for the extraneous-matter region Fm may be arbitrary changed.

When having fixed an extraneous-matter region, the fixing unit 25 masks this extraneous-matter region to generate a masked image. The fixing unit 25 superposes the masked image on the camera image I, and outputs the superposed image to the vehicle controller 15 (see FIG. 2).

Thus, the vehicle controller 15 is capable of reducing various erroneous sensing due to an extraneous matter. In other words, it is possible to reduce erroneous vehicle control due to an extraneous matter. For example, when determining that a region of an extraneous matter in the camera image I is large and thus it is difficult to safely continue an automatic parking control, the vehicle controller 15 stops automatic parking control. As described above, the vehicle controller 15 performs automatic parking control only when the safe of a vehicle is secured, so that it is possible to improve the safety of the vehicle.

Figure 8:
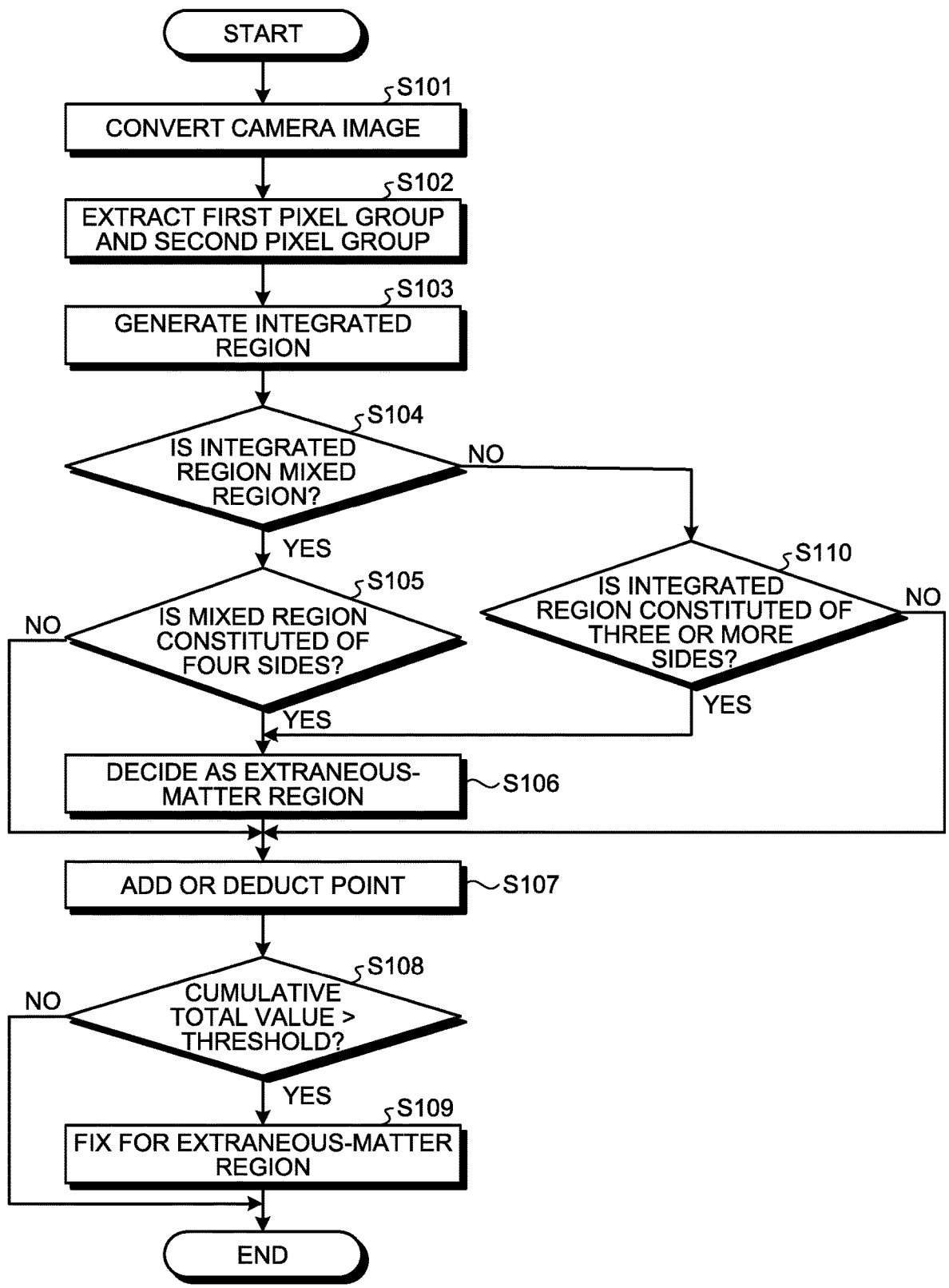
FIG. 8 is a flowchart illustrating a processing procedure to be executed by the extraneous-matter detecting apparatus according to the first embodiment.

Next, a processing procedure to be executed by the extraneous-matter detecting apparatus 1 according to the embodiment will be explained with reference to FIG. 8. FIG. 8 is a flowchart illustrating a processing procedure to be executed by the extraneous-matter detecting apparatus 1.

As illustrated in FIG. 8, the conversion unit 21 converts the camera image I (Step S101), and the first extraction unit 22 and the second extraction unit 23 respectively extract the first pixel group P1 and the second pixel group P2 (Step S102).

Subsequently, the generation unit 24a generates the integrated region Ri (Step S103). Subsequently, the decision unit 24b determines whether or not the integrated region Ri is the mixed region Rim (Step S104).

When the integrated region Ri is the mixed region Rim (Step S104: Yes), the decision unit 24b determines whether or not the mixed region Rim is constituted of four sides (Step S105).

When the mixed region Rim is constituted of four sides (Step S105: Yes), the decision unit 24b decides the mixed region Rim as an extraneous-matter region (Step S106).

On the other hand, when the mixed region Rim is constituted of three or less sides (Step S105: No), the decision unit 24b omits the process of Step S106. When the integrated region Ri is not the mixed region Rim (Step S104: No), this integrated region Ri is the single region Rio, and thus the decision unit 24b determines whether or not the single region Rio is constituted of three or more sides (Step S110).

When the single region Rio is constituted of equal to or more three sides (Step S110: Yes), the decision unit 24b shifts the processing to Step S106, and when the single region Rio is constituted of two or less sides (Step S110: No), the decision unit 24b shifts the processing to Step S107.

Subsequently, the fixing unit 25 adds or deducts a point to or from each region on the basis of the extraneous-matter region decided by the decision unit 24b (Step S107). The fixing unit 25 determines whether or not a cumulative total value of each of the regions is larger than a threshold (Step S108).

When the cumulative total value is larger than the threshold (Step S108: Yes), the fixing unit 25 fixes the corresponding region for an extraneous-matter region (Step S109), and ends the processing. On the other hand, when the cumulative total value is equal to or less than the threshold (Step S108: No), the fixing unit 25 omits the process of Step S109 to end the processing.

As described above, the extraneous-matter detecting apparatus 1 according to the first embodiment includes, the first extraction unit 22, the second extraction unit 23, and the detection unit 24. The first extraction unit 22 extracts the first pixel group P1 of first pixels included in the camera image I captured by the camera 10 (one example of "image capturing device"). Each of the first pixels has a luminance gradient directed outward from a predetermined center region. The second extraction unit 23 extracts the second pixel group P2 of second pixels included in the camera image I. Each of the second pixels has a luminance gradient directed inward toward the predetermined center region. The detection unit 24 combines the first pixel group P1, extracted by the first extraction unit 22, and the second pixel group P2, extracted by the second extraction unit 23, with each other so as to detect an extraneous matter adhered to the camera 10. Therefore, by employing the extraneous-matter detecting apparatus 1 according to the first embodiment, it is possible to reduce detection failure of an extraneous matter.

Second Embodiment

Figure 9A:
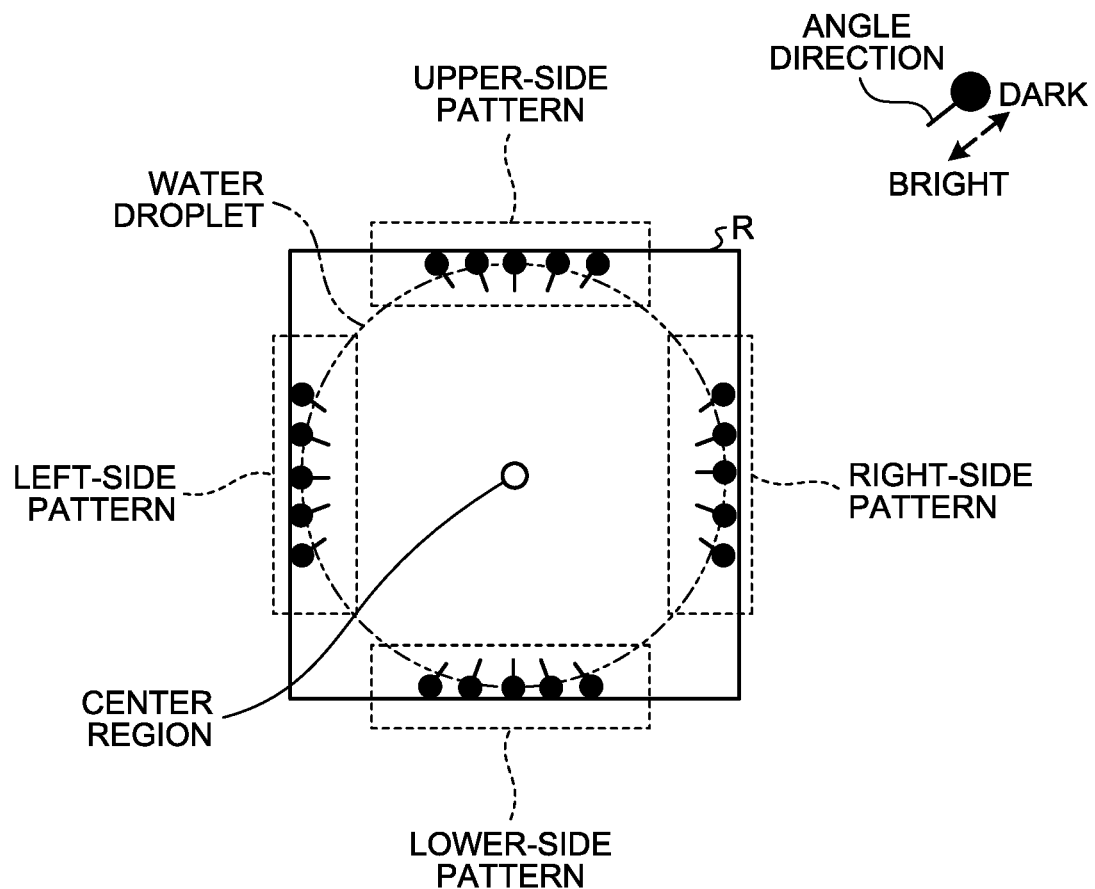
FIG. 9A is a diagram illustrating a basic concept of an extraneous-matter detecting method.
Figure 9B:
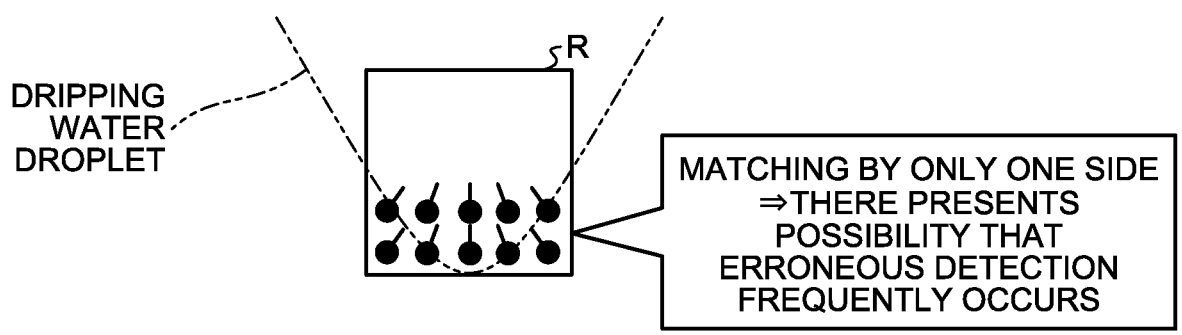
FIG. 9B is a diagram illustrating a case where a shape of a water droplet is deformed from a circular shape.
Figure 9C:
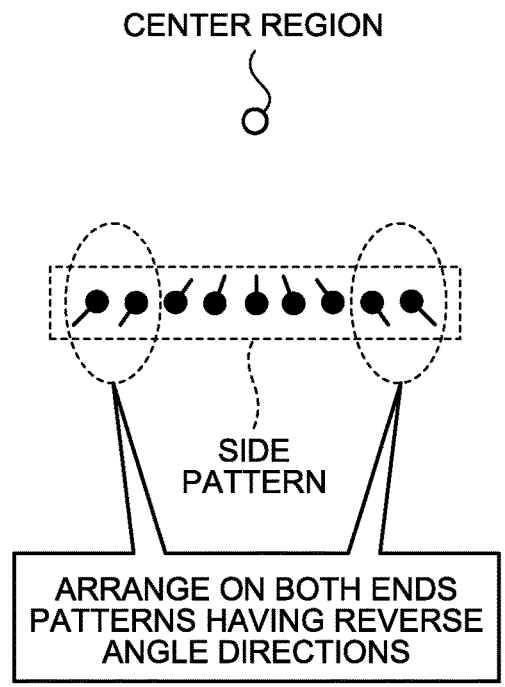
FIGS. 9C and 9D are diagrams illustrating the outline of the extraneous-matter detecting method according to a second embodiment.
Figure 9D:
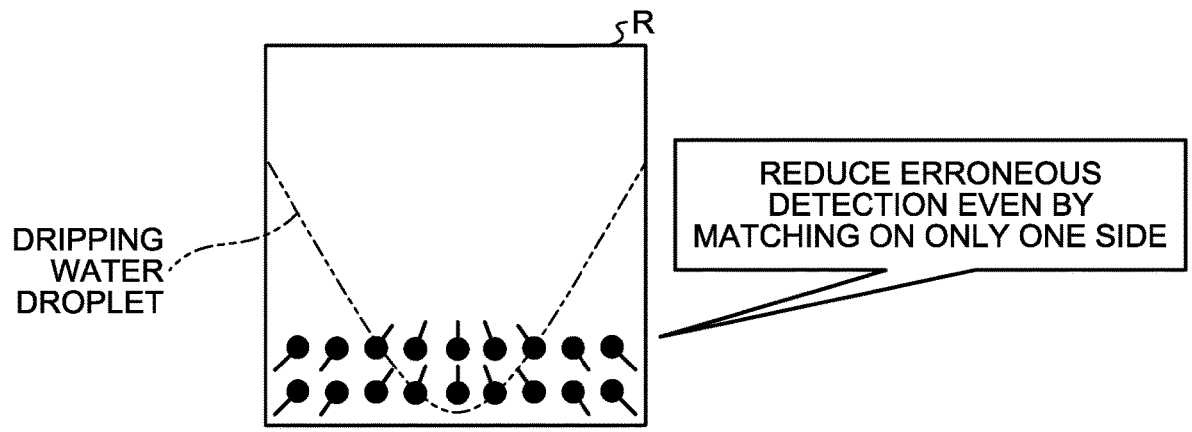

Next, an extraneous-matter detecting apparatus 1B and an extraneous-matter detecting method according to a second embodiment will be explained. An outline of the extraneous-matter detecting method according to the present embodiment will be explained with reference to FIGS. 9A to 9D. FIG. 9A is a diagram illustrating a basic concept of the extraneous-matter detecting method. FIG. 9B is a diagram illustrating a case where a shape of a water droplet is deformed from a circular shape. FIGS. 9C and 9D are diagrams illustrating the outline of the extraneous-matter detecting method according to the second embodiment.

The extraneous-matter detecting method basically first extracts edge information from a camera image. The edge information indicates, for example, a luminance gradient of each pixel in a camera image. The extraneous-matter detecting method searches from a camera image, on the basis of this edge information, for pixel arrays, each having a corresponding pattern of a feature of a water droplet, by using a method such as template matching; and detects, by using a combination of the searched pixel arrays, a region to which a water droplet is estimated to be adhering, as a detection region.

As illustrated in FIG. 9A, a shape of a water droplet such as a raindrop is commonly circular unless being not deformed. When detecting this circular water droplet, as illustrated in FIG. 9A, the extraneous-matter detecting method uses, as a template, patterns of edge information on pixels corresponding to each side of a rectangle that enclose the circular water droplet, for example.

In FIG. 9A, for convenience of visual understanding, a luminance gradient, including its angle direction and its brightness, of each pixel is schematically illustrated by using a pin-shaped symbol. In FIG. 9A, a water droplet is exemplified whose brightness increases toward its center region. In a case of the water droplet whose brightness decreases toward its center region, an angle direction of each side pattern is obtained by rotating, by an angle of 180 degrees, that of the water droplet whose brightness increases toward its center region.

When coincident pixel arrays are extracted on, for example, three or more sides among from the side patterns (namely, upper-side pattern, lower-side pattern, left-side pattern, and right-side pattern), the extraneous-matter detecting method detects the above-mentioned rectangle as a detection region R.

As illustrated in FIG. 9B, there presents a case where an adhering matter is a water droplet having a non-circular shape, such as a dripping water droplet. In this case, it is difficult to detect, by using side patterns obtained by supposing a circular water droplet illustrated in FIG. 9A, the detection region R on the basis of the coincidence on the above-mentioned three or more sides, for example.

Meanwhile, as illustrated in FIG. 9B, for example, when the detection region R is to be detected by extracting a plurality of pixel arrays that coincides with the lower-side pattern illustrated in FIG. 9A, reflection from a wet road surface, a body of a vehicle, etc. forms, in a camera image, an profile similar to that of a dripping water droplet. In other words, as illustrated in FIG. 9B, matching by only one side has possibility that erroneous detection frequently occurs.

Therefore, the extraneous-matter detecting method according to the present embodiment uses a template obtained by arranging, on both ends of each side pattern illustrated in FIG. 9A, patterns having reverse angle directions. Specifically, as illustrated in FIG. 9C, patterns, having luminance radially decreasing toward a predetermined center region, are arranged on both ends of each conventional side pattern that has luminance increasing toward the above-mentioned predetermined center region. In short, as illustrated in FIG. 9C, patterns having angle directions reverse to an angle direction of each conventional side pattern are arranged on both ends of the corresponding conventional side pattern.

In a case of a water droplet whose brightness decreases toward its center region, patterns that has luminance radially increasing toward the center region are arranged on both ends of each side pattern that has luminance decreasing toward the center region.

In other words, the extraneous-matter detecting method according to the second embodiment uses a template in which, on both ends of a pattern corresponding to a first pixel group having luminance that radially changes on a first direction with respect to a predetermined center region, patterns are arranged that are corresponding to a second pixel group having luminance that radially changes in a direction reverse to the above-mentioned first direction with respect to the above-mentioned predetermined center region.

This is because, as illustrated in FIG. 9D, for example, in the vicinity of a profile of a dripping water droplet, a feature presents in which an angle direction of a pixel with respect to the droplet's center region is reversed between the inside and the outside of the profile.

Therefore, when performing template matching using the side pattern illustrated in FIG. 9C as a lower-side pattern, as illustrated in FIG. 9D, a plurality of pixel arrays that coincide with this lower-side pattern is continuously extracted, for example, it is possible to detect, as a region to which a dripping water droplet is adhering, the detection region R having a length equal to a length of these pixel arrays. In other words, it is possible to detect, as the detection region R, a rectangle having one side on which a plurality of patterns (plurality of arrays or plurality of steps) of arrays, being a matching range having a reverse pattern on its both ends, are extracted with respect to a center region of the rectangle. In other words, as illustrated in FIG. 9D, it is possible to reduce erroneous detection even by matching on only one side.

As described above, by employing the extraneous-matter detecting method according to the present embodiment, it is possible to improve detection accuracy of a water droplet.

Hereinafter, an embodiment of the extraneous-matter detecting apparatus 1B according to the second embodiment for which the above-mentioned extraneous-matter detecting method is employed will be further specifically explained.

Figure 10:
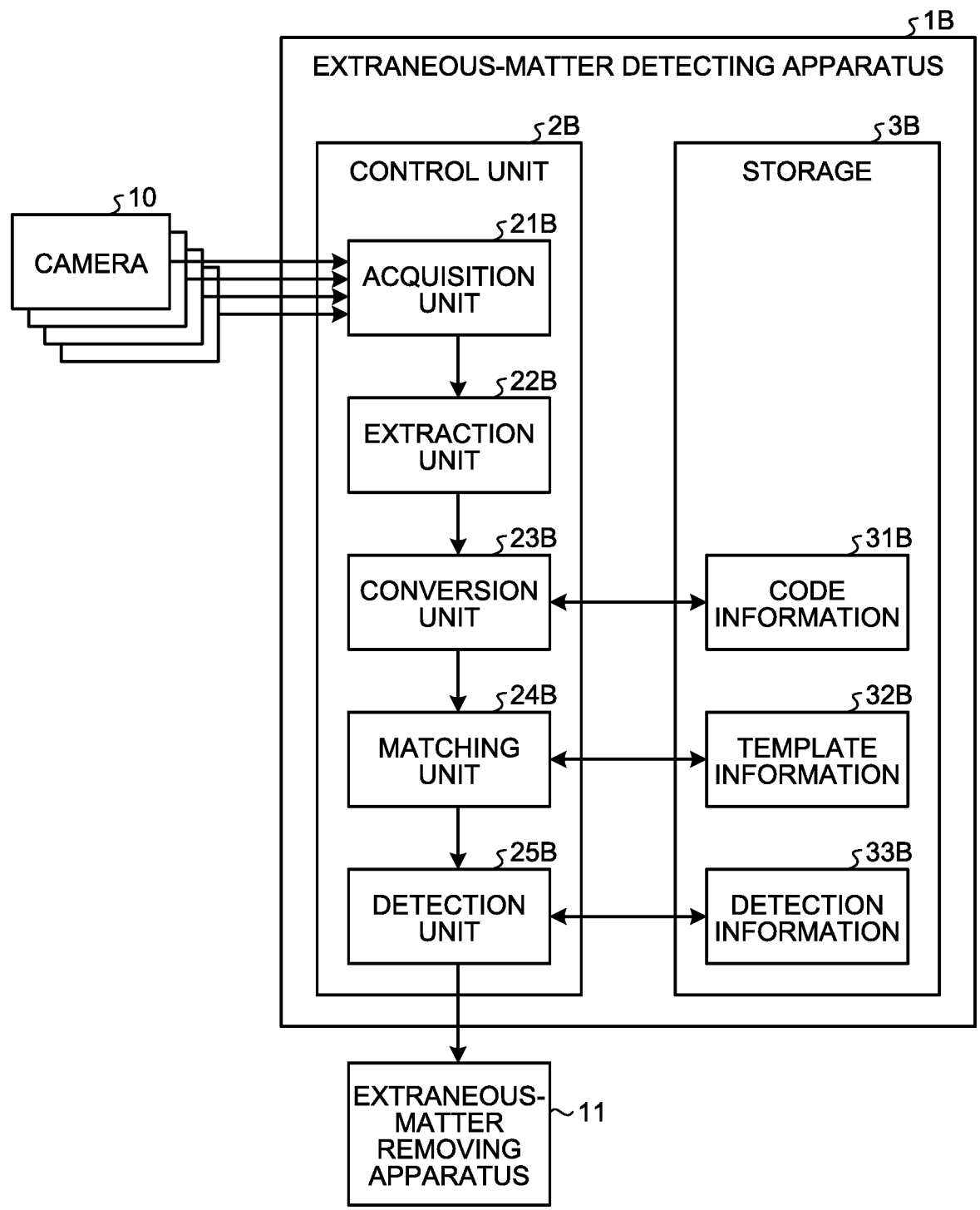
FIG. 10 is a block diagram illustrating an extraneous-matter detecting apparatus according to the second embodiment.

FIG. 10 is a block diagram illustrating the extraneous-matter detecting apparatus 1B according to the second embodiment. In FIG. 10, configuration elements needed for explaining features according to the present embodiment are illustrated by using functional blocks, and explanation of common configuration elements is appropriately omitted.

As illustrated in FIG. 10, the extraneous-matter detecting apparatus 1B is connected to, for example, an extraneous-matter removing apparatus 11 and the plurality of cameras 10 (in this case, four cameras).

The extraneous-matter removing apparatus 11 removes, on the basis of a detection result of the extraneous-matter detecting apparatus 1, a water droplet adhered to the camera 10. The extraneous-matter removing apparatus 11 ejects, for example, compressed air toward the corresponding camera 10 so as to remove the water droplet. The extraneous-matter removing apparatus 11 may eject, for example, washer fluid toward the camera 10, or may wipe the camera 10 by using a wiper.

The extraneous-matter detecting apparatus 1B includes a control unit 2B and a storage 3B. The control unit 2B includes an acquisition unit 21B, an extraction unit 22B, a conversion unit 23B, a matching unit 24B, and a detection unit 25B. The storage 3B stores therein code information 31B, template information 32B, and detection information 33B.

The acquisition unit 21B acquires, from the camera 10, a camera image; executes a grayscale process on this camera image so as to convert the camera image into a gray-scaled image; and outputs the gray-scaled image to the extraction unit 22B. The extraction unit 22B applies a Sobel filter to the gray-scaled image input from the acquisition unit 21B, so as to extract edge information of each pixel in the gray-scaled image; and outputs the extracted edge information to the conversion unit 23B (see FIG. 3A).

The conversion unit 23B encodes the computed edge directions (see FIG. 3C). The encoded edge directions are stored as the code information 31B. The conversion unit 23B outputs, to the matching unit 24B, the gray-scaled image obtained by encoding the pixels.

The extraneous-matter detecting apparatus 1B is configured to obtain a representative value of edges of the plurality of pixels, for example, so as to encode this representative value. This point has already been described with reference to FIG. 3B and the like, and thus description thereof is omitted here.

The matching unit 24B executes a matching process using a regular expression between the encoded gray-scaled image input from the conversion unit 23B, and a code pattern indicating a feature of a water droplet. The above-mentioned regular expression indicates a set of code arrays by using one code.

The matching unit 24B executes the matching process by using the regular expression, and accordingly needs no complicated process. Thus, it is possible to detect a water droplet while reducing the processing load.

The code pattern indicating a feature of a water droplet is stored in the template information 32B. Details of this code pattern will be mentioned later with reference to FIG. 12A. Details of the process to be executed by the matching unit 24B will be mentioned later with reference to FIGS. 12B to 12D.

The detection unit 25B detects, on the basis of the code pattern extracted by the matching unit 24B, a water droplet adhered to the camera 10. The detection process to be executed by the detection unit 25B will be mentioned later with reference to FIG. 11.

Figure 11:
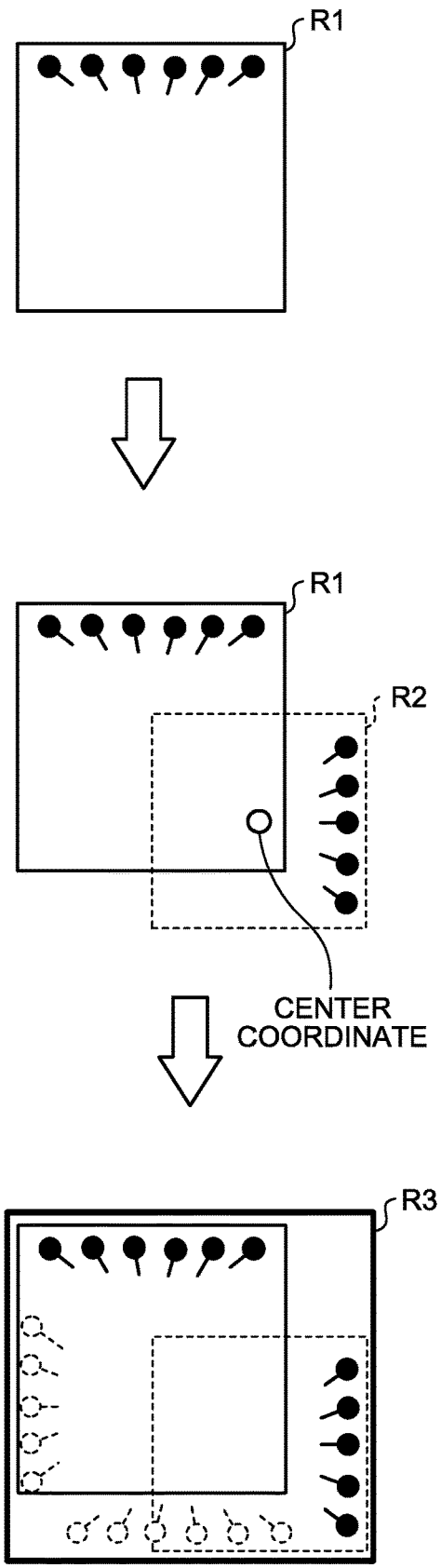
FIG. 11 is a diagram illustrating one example of a detection process to be executed by a detection unit.

Next, the detection process to be executed by the detection unit 25B will be explained with reference to FIG. 11. FIG. 11 is a diagram illustrating one example of the detection process to be executed by the detection unit 25B. In FIG. 11, similarly to the case illustrated in FIG. 4C, actual edge directions are schematically illustrated instead of codes.

The case will be explained in which the matching unit 24B first extracts an upper-side pattern. The detection unit 25B sets, on the basis of a length of the extracted upper-side pattern, a substantially square-shaped detection region R1.

Subsequently, assume that the matching unit 24B extracts a right-side pattern at a position deviated from the detection region R1. In this case, when center coordinates of a detection region R2 of the right-side pattern is within the detection region R1, the detection unit 25B executes a process for integrating both of the detection regions R1 and R2.

Next, when a lower-side pattern or a left-side pattern is extracted in an integrated detection region R3, for example, the detection unit 25B detects a water droplet in the integrated detection region R3. In other words, the detection unit 25B detects a water droplet under a detection condition (hereinafter, may be referred to as "direction condition") that patterns indicating sides having three or more different directions are extracted in the detection region R3.

For example, the detection unit 25B may detect a water droplet under, other than the above-mentioned direction condition, a detection condition (hereinafter, may be referred to as "count condition") that a pattern indicating a side is extracted at predetermined counts (for example, four counts including upper, lower, right, and left) or more in the integrated detection region R3.

As described above, by employing a detection condition that is the direction condition in three or more directions or the count condition, it is possible to detect a water droplet even when all sides of upper, lower, right, and left sides are not extracted. In other words, it is possible to detect a water droplet whole of which is not enclosed in a camera image.

For example, the direction condition may be changed in accordance with a region in which a water droplet is to be detected. For example, the direction condition of the center region of a camera image is set in four directions. Thus, it is possible to improve detection accuracy of a water droplet.

For example, a direction condition of each of four corner regions of a camera image is set in two directions. Thus, it is possible to detect a fan-shaped water droplet that presents at a corner of a camera image and whole of which is not enclosed in the camera image.

In FIG. 11, the case is exemplified in which detection regions are integrated when the center coordinates of the detection region R2 are within the detection region R1 of the upper-side pattern; however, not limited thereto. In other words, both of the detection regions may be integrated only when at least parts of the detection region R1 and the detection region R2 are overlapped with each other.

The integrated detection region R3 may be a logical conjunction between the detection region R1 and the detection region R2, or may be a logical disjunction between the detection region R1 and the detection region R2. In FIG. 11, the case is exemplified in which each of the detection region R1 and the detection region R2 has a rectangular shape; however, not limited thereto, a shape of the detection region may be an arbitrary one such as a circular shape.

The detection unit 25B may detect a water droplet on the basis of detection results in a plurality of frames.

Figure 12A:
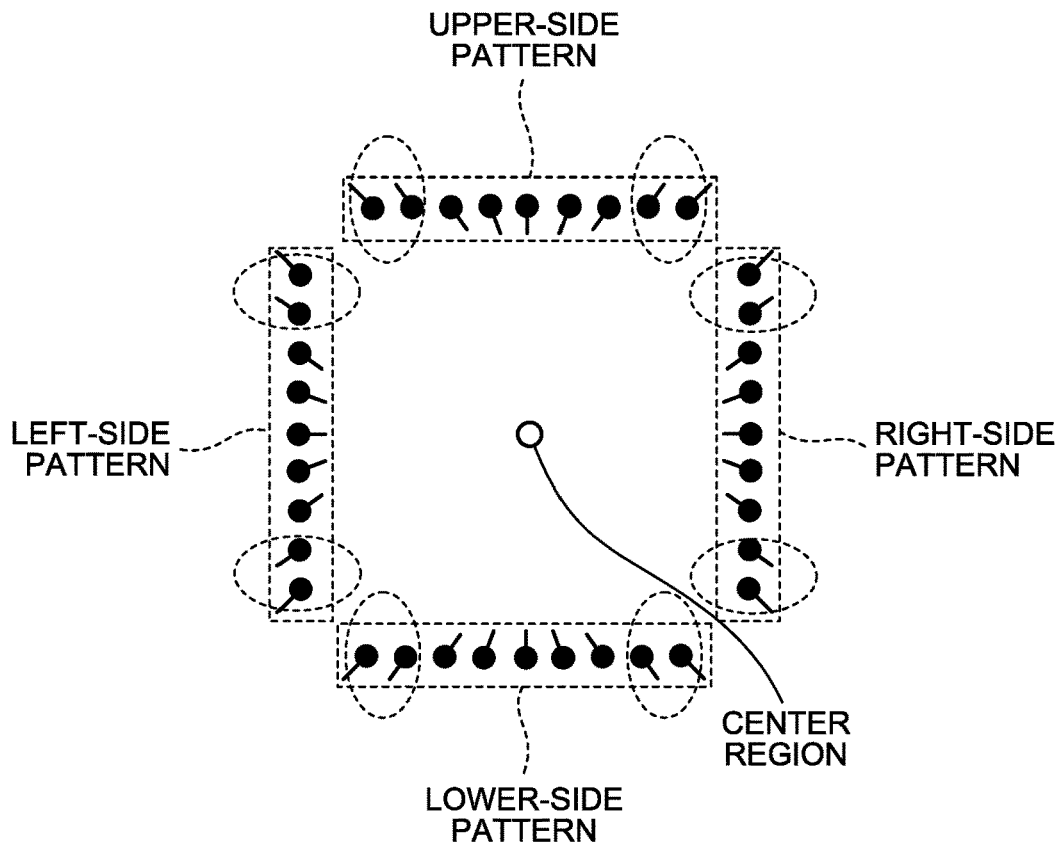
FIG. 12A is a diagram illustrating one example of a template.
Figure 12B:
FIGS. 12B to 12D are diagrams illustrating examples of matching processes to be executed by a matching unit.
Figure 12B:
Figure 12B:
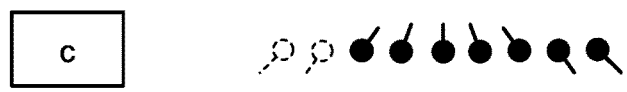
Figure 12B:
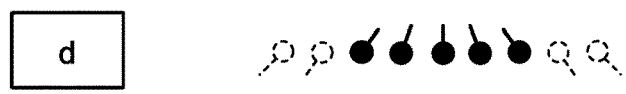
Figure 12C:
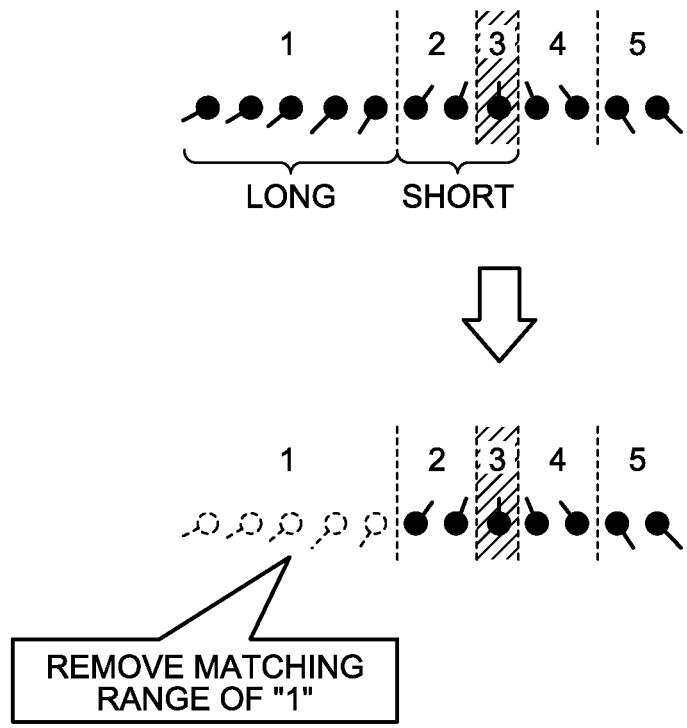
Figure 12D:
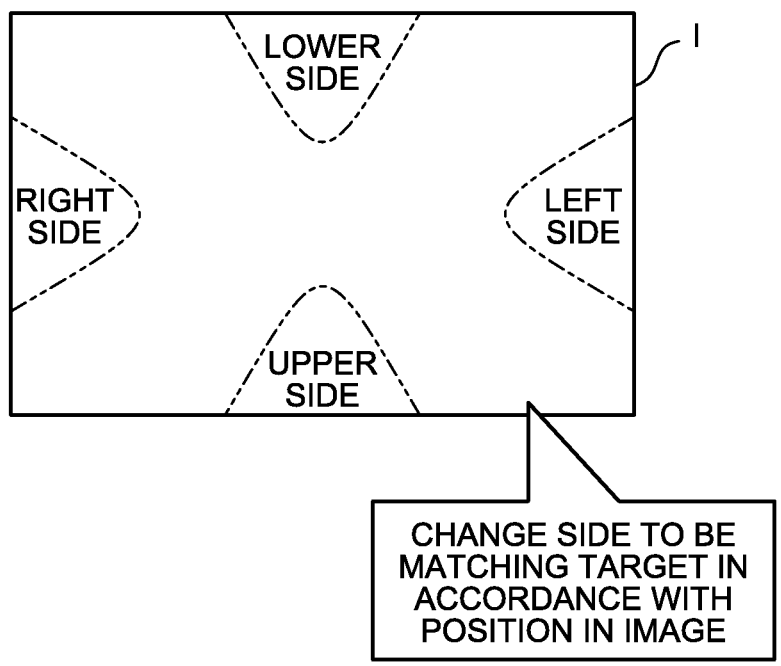

Next, a process to be executed by the matching unit 24B when a water droplet, having a shape different from a circular shape, is detected will be explained with reference to FIGS. 12A to 12D. FIG. 12A is a diagram illustrating one example of a template according to the embodiment. FIGS. 12B to 12D are diagrams illustrating examples of matching processes to be executed by the matching unit 24B.

In FIG. 12A, similarly to the case illustrated in FIG. 11, a template is schematically illustrated by using actual edge directions instead of the above-mentioned codes. As illustrated in FIG. 12A, the extraneous-matter detecting apparatus 1B has, as a template, code patterns that are code arrays indicating a feature of a water droplet having a shape different from a circular shape. For example, similarly to the case illustrated in FIG. 11, the template of the extraneous-matter detecting apparatus 1B has an upper-side pattern, a lower-side pattern, a left-side pattern, and a right-side pattern.

Note that, unlike the case illustrated in FIG. 11, each of side patterns, corresponding to at least a water droplet having a shape different from a circular shape, has, on both ends of a pattern whose luminance radially changes in a first direction with respect to a predetermined center region, patterns whose luminance radially changes in a direction reverse to the above-mentioned first direction (see parts enclosed by closed curves of dashed lines illustrated in FIG. 12A).

In FIG. 12A, the example is illustrated in which the brightness increases toward the center region; however, when the brightness decreases toward the center region, edge directions of each of the side patterns may be rotated by an angle of 180 degrees.

In a case where the template illustrated in FIG. 12A is employed, the matching unit 24B determines that a code pattern coincides with a side pattern indicating a feature of a water droplet, regardless of whether or not the code pattern includes a pattern in the above-mentioned reverse direction. Specifically, as illustrated in FIG. 12B, taking a lower-side pattern of a water droplet, whose brightness increases toward its center region, as an example, as illustrated in "a" of FIG. 12B, the matching unit 24B executes a matching process so as to extract a code array that coincides with a lower-side pattern having, on its both ends, patterns of a reverse direction.

As illustrated in "b" and "c" of FIG. 12B, the matching unit 24B executes the matching process so as to extract a code array that coincides with a lower-side pattern having, on its left or right edge, a pattern of a reverse direction.

As illustrated in "d" of FIG. 12B, the matching unit 24B extracts a code array that coincides with a lower-side pattern having, on its left and right edge, no pattern of a reverse direction.

Thus, it is possible to perform matching on, not limited to a circular water droplet, a water droplet having a shape different from a circular shape such as a dripping water droplet. Moreover, it is further possible to perform the matching even when there presents a partial defect in the pattern.

In a case where the code arrays, each of which coincides with a lower-side pattern having on its both ends patterns of a reverse direction, are extracted; when these code arrays are continuously extracted on only one side, the detection unit 25B is capable of detecting a rectangle having this side as the detection region R to which a water droplet is adhering (see FIG. 9D).

When any of the examples of the code arrays, that are illustrated in "b" to "d" of FIG. 12B, is extracted, the detection unit 25B detects the detection region R in accordance with the detection process having been explained with reference to FIG. 11.

Even when the template illustrated in FIG. 12A is used, the matching unit 24B may remove a code array having a low balance from the extracted code arrays.

Specifically, as illustrated in FIG. 12C, the matching unit 24B checks in detail the balance between code arrays corresponding to patterns of a reverse direction, for example. In FIG. 12C, a code array having a matching range indicated by "2" to "4" corresponds to a pattern of the above-mentioned first direction, and code arrays having matching ranges indicated by "1" and "5" correspond to patterns of the reverse direction.

In this case, as illustrated in FIG. 12C, when there presents a relation that a length of the "1" matching range>a length of "2" and "3" matching ranges, the matching unit 24B removes the "1" matching range, for example. Similarly, when there presents a relation that a length of the "5" matching range>a length of "3" and "4" matching ranges, the matching unit 24B removes the "5" matching range, for example (not illustrated). A whole or a part of the matching range may be removed. Thus, erroneous and needless extraction of a code pattern of an object other than a water droplet is able to be prevented, so that it is possible to reduce erroneous detection of a water droplet.

When the balance within a matching range is adjusted, the matching range includes, on its both ends, patterns having a reverse direction, and a plurality of such matching ranges is continuously extracted on only one side; the detection unit 25B is able to fix, for the detection region R to which a water droplet is adhering (see FIG. 9D), a rectangle having this one side.

When using the template illustrated in FIG. 12A, as illustrated in FIG. 12D, the matching unit 24B changes a side to be a matching target in accordance with a position in the camera image I. Specifically, as illustrated in FIG. 12D, the matching unit 24B changes a side to be a matching target into a "lower-side" pattern in an upper part of the camera image I, and further changes a side to be a matching target into an "upper side" pattern in a lower part of the camera image I. The matching unit 24B changes a side to be a matching target into a "right-side" pattern in a left part of the camera image I, and further changes a side to be a matching target into a "left-side" pattern in a right part of the camera image I.

This is because there presents a feature that a partial profile of a water droplet directs toward the center portion of the camera image I. By employing the above-mentioned changing of a side to be a matching target, it is possible to detect a water droplet adhering to an end part of the camera image I having a shape different from a circular shape.

Figure 13A:
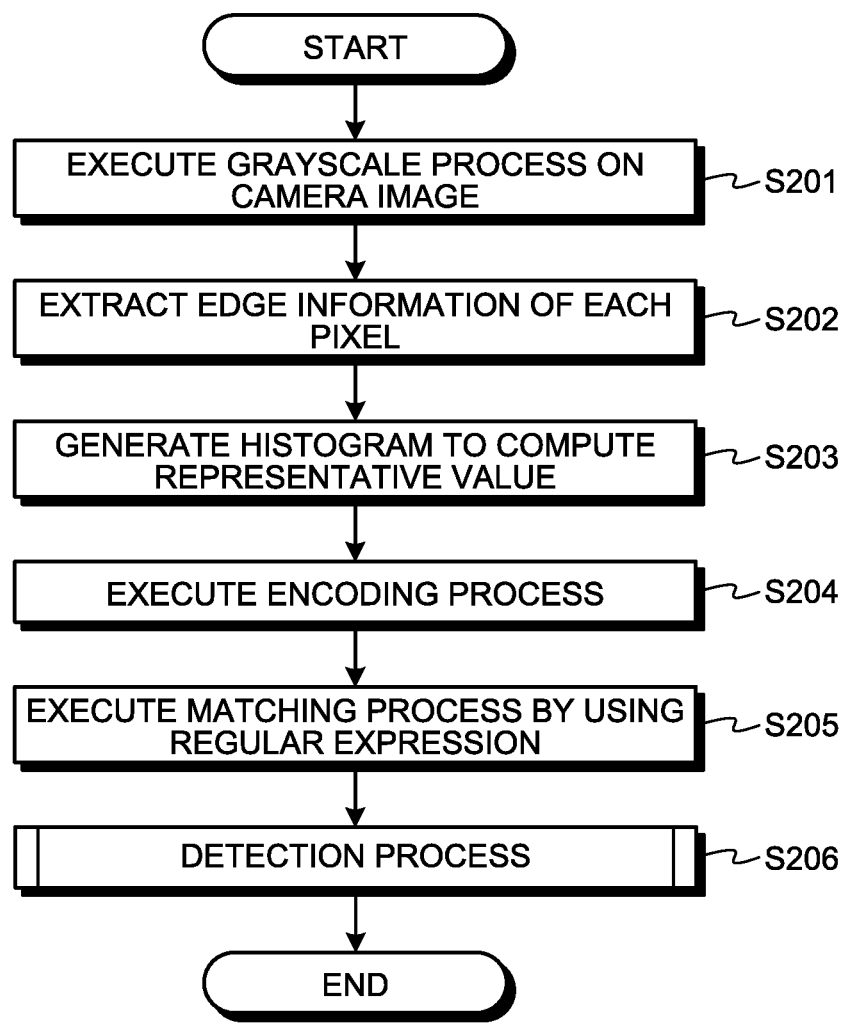
FIG. 13A is a flowchart illustrating a processing procedure to be executed by the extraneous-matter detecting apparatus according to the second embodiment.
Figure 13B:
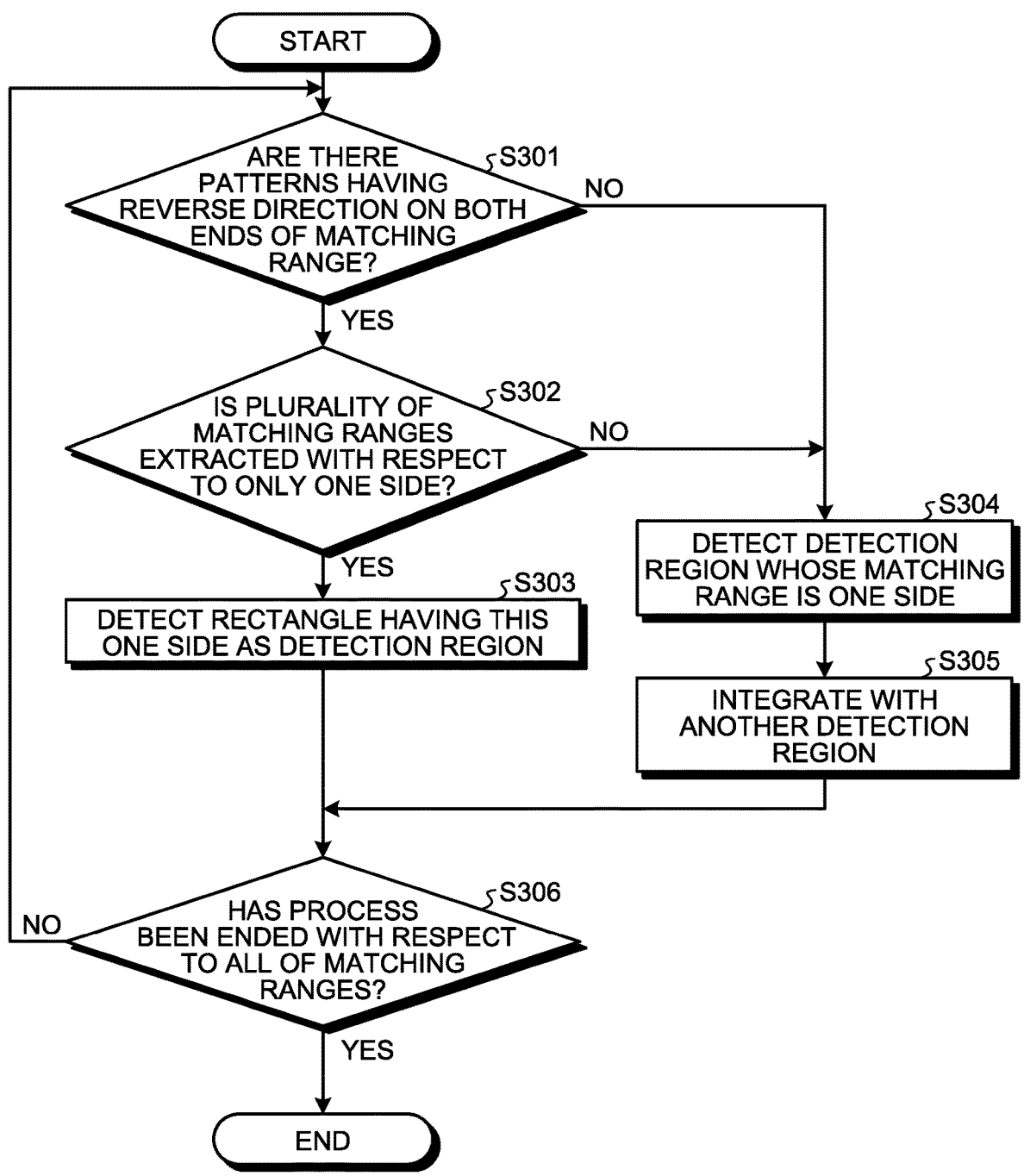
FIG. 13B is a flowchart illustrating a processing procedure for the detection process according to the second embodiment.

Next, a processing procedure to be executed by the extraneous-matter detecting apparatus 1B according to the embodiment will be explained with reference to FIGS. 13A and 13B. FIG. 13A is a flowchart illustrating the processing procedure to be executed by the extraneous-matter detecting apparatus 1B according to the second embodiment. FIG. 13B is a flowchart illustrating the processing procedure for the detection process according to the second embodiment. The following processes are repeatedly executed by the control unit 2B.

As illustrated in FIG. 13A, the acquisition unit 21B acquires a camera image from the camera 10, and executes a grayscale process on this camera image (Step S201). Subsequently, the extraction unit 22B extracts edge information of each pixel from the gray-scaled image (Step S202).

Next, the conversion unit 23B generates a histogram on the basis of the edge information extracted from the extraction unit 22B, and computes a representative value (Step S203). Next, the conversion unit 23B executes an encoding process for encoding a representative value for each cell (Step S204).

Subsequently, the matching unit 24B executes, on the encoded gray-scaled image, a matching process by using a regular expression (Step S205). As illustrated in FIGS. 9D and 11, the detection unit 25B executes a detection process for detecting a water droplet (Step S206).

Specifically, as illustrated in FIG. 13B, the detection unit 25B determines whether or not there presents patterns having a reverse direction on both ends of a matching range extracted by the matching unit 24B (Step S301). When there presents the patterns having a reverse direction (Step S301: Yes), the detection unit 25B determines whether or not a plurality of such matching ranges is extracted with respect to only one side of side patterns (Step S302). In other words, the detection unit 25B determines whether or not the matching unit 24B extracts a plurality of patterns (plurality of arrays) of matching ranges, each of which has on its both ends patterns having a reverse direction with respect to a center region.

When the plurality of patterns is extracted (Step S302: Yes), a rectangle having this one side is detected to be the detection region R (Step S303). This case where "the plurality of patterns is extracted" corresponds to, for example, the case illustrated in FIG. 9D. On the other hand, the determination condition of Step S301 or Step S302 is not satisfied (Step S301: No or Step S302: No), the detection unit 25B detects a detection region (for example, detection region R1) whose matching range is one side (Step S304).

The detection unit 25B integrates the detection region R1 with another detection region (for example, detection region R2) (Step S305), so as to detect, for example, the detection region R3.

Next, it is determined whether or not the process has been ended with respect to all of the matching ranges (Step S306). When the process has not been ended with respect to all of the matching ranges (Step S306: No), the processing is repeated from Step S301. When the process has been ended with respect to all of the matching ranges (Step S306: Yes), the processing is ended.

As described above, the extraneous-matter detecting apparatus 1B according to the second embodiment includes the matching unit 24B (one example of "search unit") and the detection unit 25B. The matching unit 24B searches a camera image, captured by the camera 10 (one example of "image capturing device"), for a first pixel group and a second pixel group. The first pixel group has a luminance that radially changes in a first direction with respect to a predetermined center region, and the second pixel group has a luminance radially changes in a second direction reverse to the first direction. The detection unit 25B detects, when the matching unit 24B extracts an array constituted of the first pixel group and the second pixel group existing on both ends of the first pixel group, a water droplet adhered to the camera 10.

Therefore, by employing the extraneous-matter detecting apparatus 1B according to the embodiment, it is possible to detect a water droplet having a shape different from a circular shape. In other words, it is possible to improve detection accuracy of a water droplet.

When the matching unit 24B extracts, from the camera image, the plurality of arrays on one side of the rectangular detection region R with respect to the above-mentioned center region, the detection unit 25B detects a water droplet in the detection region R.

Therefore, by employing the extraneous-matter detecting apparatus 1B according to the present embodiment, it is possible to detect a water droplet with high accuracy even when the water droplet has a shape different from a circular shape, such as a teardrop shape of a dripping water droplet. In other words, it is possible to improve detection accuracy of a water droplet.

When a length of the second pixel group with respect to the first pixel group is equal to or more than a predetermined value, the matching unit 24B removes a whole or a part of the second pixel group.

Therefore, by employing the extraneous-matter detecting apparatus 1B according to the present embodiment, it is possible to prevent erroneous detection when a second pixel group having extremely long array is extracted due to reflection from a wet road surface, for example. In other words, it is possible to improve detection accuracy of a water droplet.

When searching, for the first pixel group and the second pixel group, each of sides of the rectangular detection region so as to extract the plurality of arrays, the matching unit 24B changes, in accordance with a searching position in the camera image, a side to be searched among the sides.

Therefore, by employing the extraneous-matter detecting apparatus 1B according to the present embodiment, it is possible to detect a water droplet adhering to an end part of the camera image I to have a shape different from a circular shape. In other words, it is possible to improve detection accuracy of a water droplet.

When the matching unit 24B extracts a pixel group other than the arrays, the detection unit 25B detects the detection region R1 having one side that is based on a length of the pixel group, and when at least a part of the detection region R1 overlaps with the other detection region R2, the matching unit 24B further integrates both of the detection regions R1 and R2.

Therefore, by employing the extraneous-matter detecting apparatus 1B according to the present embodiment, the detection region R is generated for each pixel group other than an array that is constituted of a first pixel group and a second pixel group existing on both ends of the first pixel group, and, when there presents an overlap therebetween, the detection regions R are integrated with each other, so that it is possible to detect a water droplet with high accuracy in the detection region R.

The above-mentioned extraneous-matter detecting apparatus 1 may be employed for an automatic parking system. For example, when recognizing, on the basis of a camera image, a vacant parking space in a parking lot, the automatic parking system automatically performs parking control on a vehicle. This parking control is performed by a parking controller provided in the vehicle. In the example illustrated in FIG. 10, the parking controller is provided instead of the extraneous-matter removing apparatus 11, when the extraneous-matter detecting apparatus 1B detects and fixes adhesion of an extraneous matter, the parking controller stops the parking control over the vehicle for safety.

In other words, in another embodiment, the camera 10 is provided in a vehicle, and the vehicle includes a parking controller (one example of "parking controlling unit") that performs parking control on the vehicle on the basis of a camera image of the camera 10. When the detection unit 25B detects adhesion of a water droplet to the camera 10, the parking controller stops the parking control over the vehicle. Therefore, by employing the extraneous-matter detecting apparatus 1 according to the other embodiment, it is possible to realize an automatic parking system having a high safety.

Third Embodiment

Figure 14A:
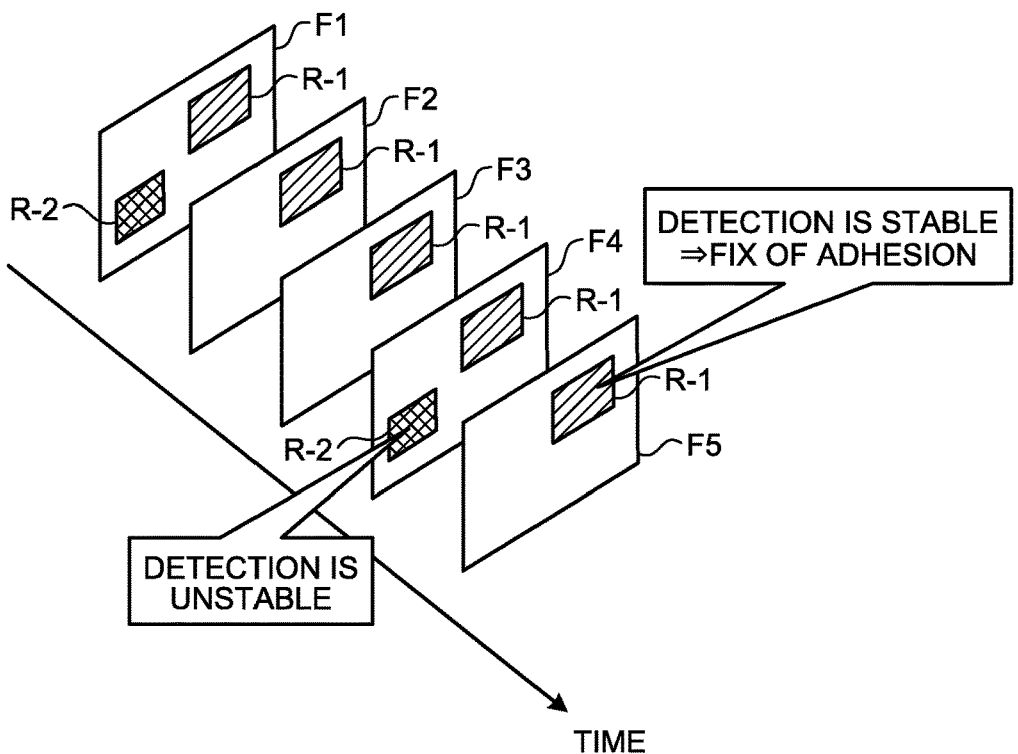
FIG. 14A is a diagram illustrating the outline of an extraneous-matter detecting method according to a conventional technology.
Figure 14B:
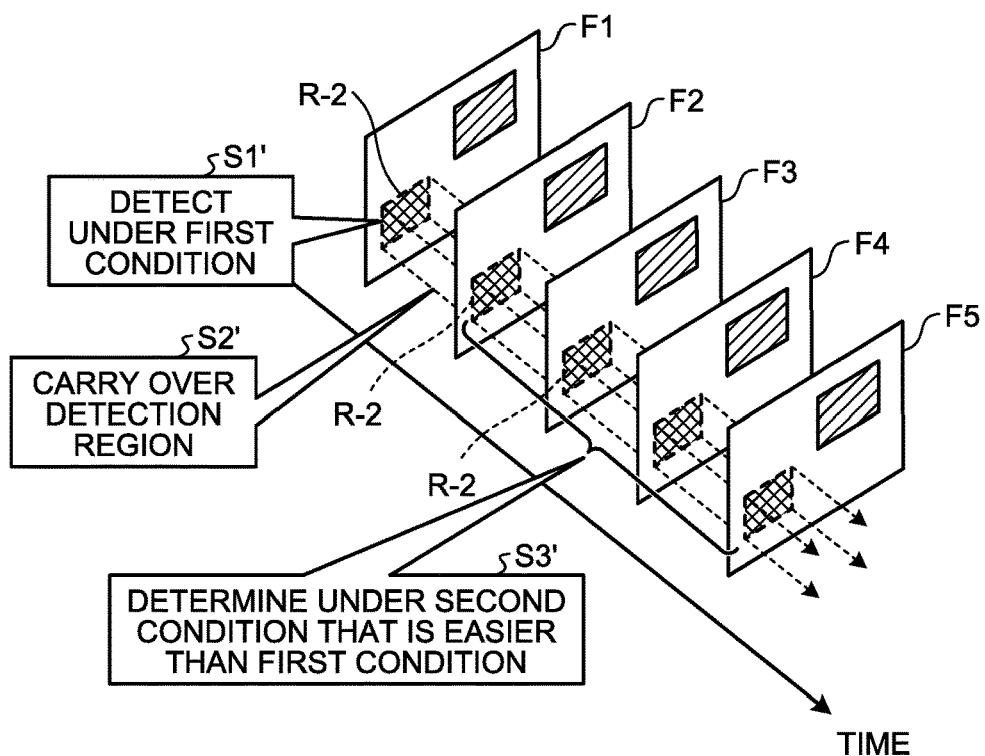
FIG. 14B is a diagram illustrating the outline of an extraneous-matter detecting method according to a third embodiment.

Next, an extraneous-matter detecting apparatus 1C and an extraneous-matter detecting method according to a third embodiment will be explained. An outline of the extraneous-matter detecting method according to the third embodiment will be explained with reference to FIGS. 14A and 14B. FIG. 14A is a diagram illustrating the outline of an extraneous-matter detecting method according to a conventional technology. FIG. 14B is a diagram illustrating the outline of the extraneous-matter detecting method according to the third embodiment.

A vehicle is provided with on-vehicle cameras, such as a front camera, a back camera, a right-side camera, and a left-side camera, in order to capture images of the periphery of the vehicle. Hereinafter, these on-vehicle cameras may be referred to as "cameras 10".

The extraneous-matter detecting apparatus performs an image analysis on each frame of an image acquired from the camera 10 so as to detect, by using a method such as template matching, a presence area of an extraneous matter in the image.

For example, as illustrated in FIG. 14A, assume that there present temporally continuous images of frames F1 to F5, an extraneous-matter detecting apparatus detects, in each of the frames F1 to F5, a detection region R-1 as an area in which an extraneous matter presents. In this case, the extraneous-matter detecting apparatus stably detects the detection region R-1, and thus is able to easily fix the fact that the extraneous matter is adhering to the detection region R-1 (hereinafter, may be referred to as "fix of adhesion").

Note that in a case where the extraneous matter is a water droplet, the appearance of the water droplet in an image is frequently changed due to a background changed by movement of the vehicle and/or the thickness of the water droplet, and thus, as illustrated in FIG. 14A by using a detection region R-2, the water droplet is detected in some frames and is not detected in other frames, namely the detection becomes unstable. In other words, the extraneous-matter detecting apparatus fails to determine "fix of adhesion" of an extraneous matter in the detection region R-2, thereby leading to possibility that detection failure of the extraneous matter occurs.

Thus, the extraneous-matter detecting method according to the third embodiment carries over a detection area of some frame, in which presence of an extraneous matter is detected on the basis of a predetermined condition, into a temporally subsequent frame. In the carried over detection area, it is estimated that possibility of presence of the extraneous matter is high, and thus presence and absence of the extraneous matter in the carried over detection area is determined by using a condition that is easier than the above-mentioned predetermined condition.

Specifically, as illustrated in FIG. 14B, in the extraneous-matter detecting method according to the third embodiment, for example, when the detection region R-2 is detected in the frame F1 under a predetermined first condition (Step S1'), the detection region R-2 is carried over into the just after frame F2 (Step S2').

The extraneous-matter detecting method according to the third embodiment determines, in the carried over detection region R-2, presence and absence of an extraneous matter under a second condition that is easier than the first condition (Step S3'). When an extraneous matter is determined to be present also in the detection region R-2 of the frame F2 on the basis of the determination result of Step S3, this detection region R-2 of the frame F2 is carried over into the frame F3, and is sequentially carried over into the frames F4 and F5.

Thus, it is possible to eliminate unstableness in detection when an extraneous matter is a water droplet or the like. Therefore, by employing the extraneous-matter detecting method according to the third embodiment, it is possible to reduce detection failure of an extraneous matter.

Moreover, by employing the extraneous-matter detecting method according to the third embodiment, a detection result, such as once-detected detection region, is able to be efficiently used in the later analysis process and the like, so that it is possible not only to reduce processing load of the overall system, but also to improve a processing speed and detection accuracy.

Hereinafter, the embodiment of the extraneous-matter detecting apparatus 1C according to the third embodiment employing therefore the above-mentioned extraneous-matter detecting method will be more specifically explained.

Figure 15:
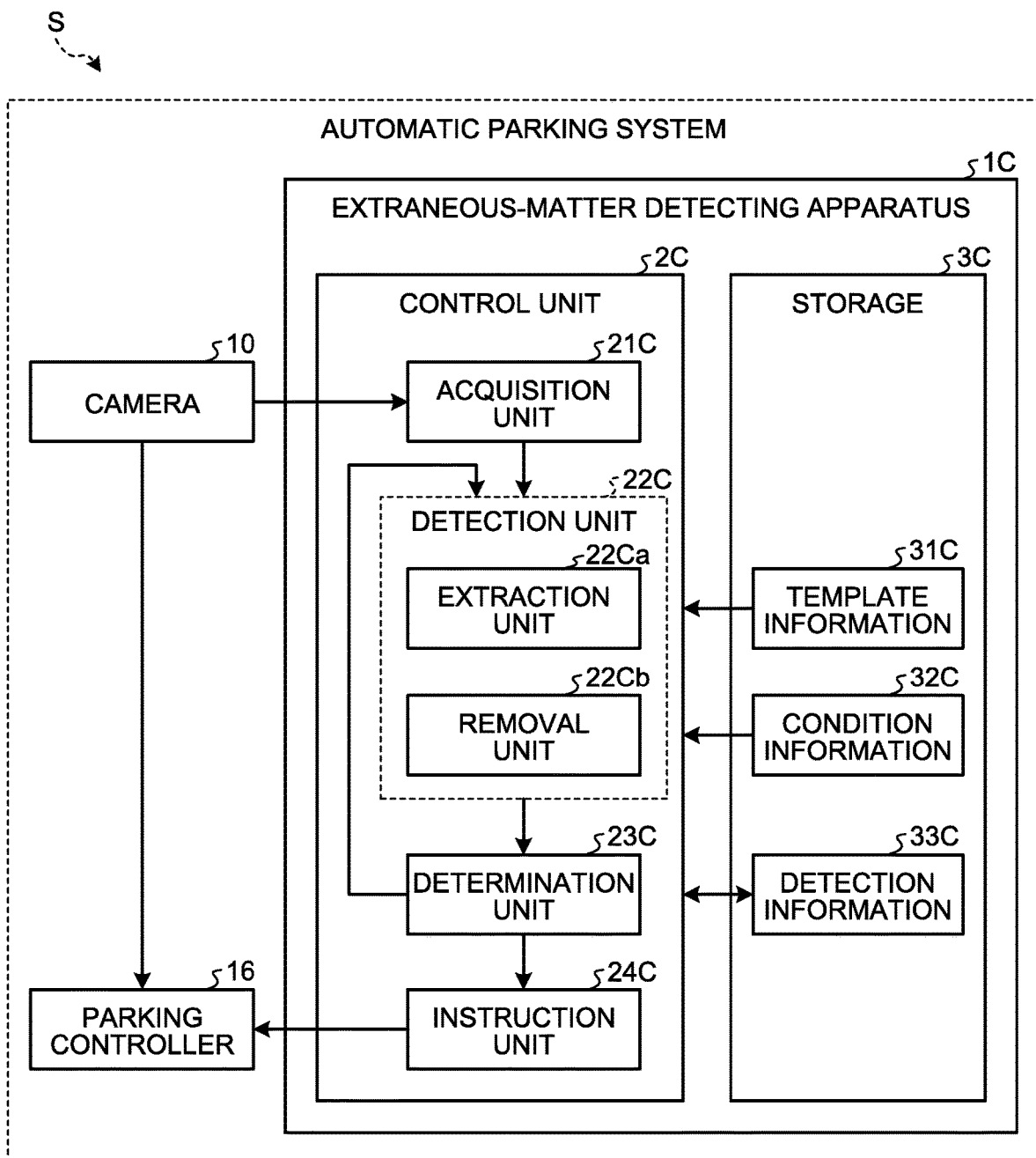
FIG. 15 is a block diagram illustrating an automatic parking system according to the third embodiment.

FIG. 15 is a block diagram illustrating an automatic parking system S according to the third embodiment. In FIG. 15, configuration elements needed for explaining features according to the present embodiment are illustrated by using functional blocks, and explanation of common configuration elements is appropriately omitted.

As illustrated in FIG. 15, the automatic parking system S includes the camera 10, a parking controller 16, and the extraneous-matter detecting apparatus 1C.

The parking controller 16 performs, on the basis of a camera image captured by the camera 10, an automatic parking control on a vehicle, when recognizing a vacant parking space in a parking lot, for example. When a determination unit 23C fixes an adhesion of an extraneous matter and an instruction unit 24C indicates a position of the extraneous matter, the parking controller 16 stops the parking control over the vehicle for safety.

The extraneous-matter detecting apparatus 1C includes a control unit 2C and a storage 3C. The control unit 2C includes an acquisition unit 21C, a detection unit 22C, the determination unit 23C, and the instruction unit 24C. The detection unit 22C includes an extraction unit 22Ca and a removal unit 22Cb.

The storage 3 is a storage device, such as a hard disc drive, a non-volatile memory, and a resister; so as to store template information 31C, condition information 32C, and detection information 33C.

The control unit 2 controls the overall extraneous-matter detecting apparatus 1. The acquisition unit 21C acquires, from the camera 10, camera images frame by frame, and executes preprocessing needed for the image analysis.

The acquisition unit 21C executes, as the preprocessing, a grayscale process on each of the camera images, for example. Furthermore, the acquisition unit 21C changes, as another preprocessing, the size of the camera images into a predetermined one, for example. The acquisition unit 21C outputs the preprocessed camera image to the detection unit 22C.

The detection unit 22C detects, on the basis of predetermined detection algorism, the detection region R to which the extraneous matter is adhering in the camera image, and informs the determination unit 23C of the detection region R.

The extraction unit 22Ca extracts from the camera image, by using the above-mentioned detection algorism, the detection region R in which the presence of the extraneous matter is estimated, and informs the removal unit 22Cb of the extracted detection region R. The extraction unit 22Ca is capable of detecting the detection region R by using the above-mentioned detection algorism (see FIG. 11).

Next, the removal unit 22Cb will be explained. The removal unit 22Cb performs an image analysis on each of the detection regions R transmitted from the extraction unit 22Ca, so as to determine whether or not the extraneous matter, estimated to be present in the corresponding detection region R, is actually an extraneous matter.

The removal unit 22Cb informs the determination unit 23C of the detection region R that is determined, on the basis of the determination result, to be an extraneous matter. On the other hand, the removal unit 22Cb removes, from a target of the later process, the detection region R that is determined by the determination unit 23C not to be an extraneous matter on the basis of the determination result, without informing the determination unit 23C of this detection region R. In other words, the removal unit 22Cb removes the detection region R having a low reliability. As described above, a needless image region is removed not only to improve detection accuracy of an extraneous matter, but also to reduce processing load of the later processes.

For example, the removal unit 22Cb generates, for each of an edge intensity, a luminance, and a chromatic value of the detection region R, a histogram that is classified by using three classes of "weak", "medium", and "strong". The removal unit 22Cb determines, on the basis of a ratio among degrees of the classes of each of the generated histograms, whether or not the detection region R is an extraneous matter; and removes the detection region R that is determined not to be an extraneous matter.

The determination unit 23C manages a state transition, transmitted from the removal unit 22Cb of the detection unit 22C, between frames of each of the detection regions R, and further determines, on the basis of the state transition, "fix of adhesion" of an extraneous matter in the corresponding detection region R.

Figures 16A, 16B:
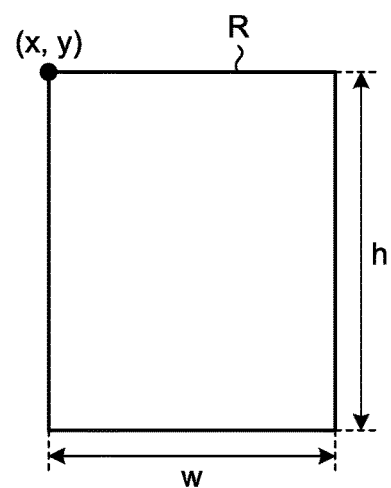
FIG. 16A is a diagram illustrating one example of notification contents transmitted from a detection unit.
FIG. 16B is a diagram illustrating one example of data contents, included in detected information, on detection areas.
Figure 16C:
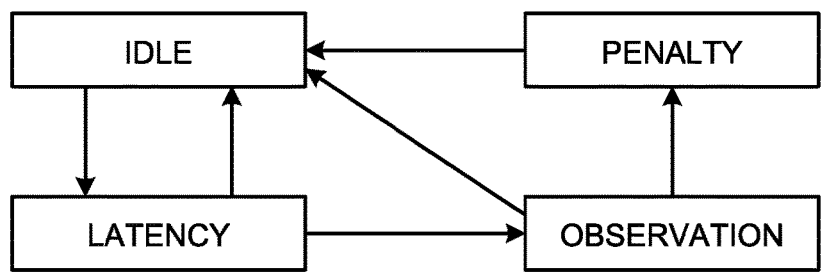
FIG. 16C is a diagram illustrating states of the detection area.

Determination processes to be executed by the determination unit 23C will be specifically explained with reference to FIGS. 16A to 17D. FIG. 16A is a diagram illustrating one example of notification contents transmitted from the detection unit 22C. FIG. 16B is a diagram illustrating one example of data contents, included in the detection information 33C, on the detection region R. FIG. 16C is a diagram illustrating states of the detection region R. FIGS. 17A to 17D are diagrams illustrating a process to be executed by the determination unit 23C.

As illustrated in FIG. 16A, notification contents transmitted from the detection unit 22C to the determination unit 23C includes, for example, upper-left coordinate values (x, y), a width "w", and a height "h" of the extracted rectangular detection region R.

The determination unit 23C determines presence and absence of an overlap between each of the extracted detection regions R determined to include respective extraneous matters in a present frame and the already-extracted detection regions R in a past frame. The determination unit 23C reflects the determination result on the "score" and the "state" of each of the detection regions R. The reflected result is managed by the detection information 33C.

As illustrated in FIG. 16B, the detection information 33C includes items of "detection area ID", "area information", "score", "state", and "ease", for example. The item of "detection area ID" stores therein identifiers of the detection regions R, and the detection information 33C is managed for each of the detection areas ID.

The item of "area information" stores therein, for example, the upper-left coordinate values (x, y), the width "w", and the height "h" of each of the detection regions R illustrated in FIG. 16A. The item of "score" stores therein present points of the detection regions R. The item of "state" stores therein present states of the detection regions R.

As illustrated in FIG. 16C by using a state machine diagram, each of the detection regions R can change into any one of four states of "IDLE", "latency", "observation", and "penalty". The "IDLE" indicates "undetected state", in other words, a state where an extraneous matter does not adhere.

The "latency" indicates a state where "there presents possibility that extraneous matter adheres".

The "observation" indicates an "observation state after removal process" that is a state in which, when a vehicle includes an extraneous-matter removing apparatus, being capable of removing an extraneous matter by using compressed air, a wiper, etc., this extraneous-matter removing apparatus has performed a removing operation on the extraneous matter. The extraneous-matter removing apparatus is, for example, the above-mentioned extraneous-matter removing apparatus 11 according to the second embodiment. The "penalty" indicates a "state where the extraneous matter has been continuously detected in the corresponding area after removal process", in other words, a state of a removal failure or an erroneous detection.

The determination unit 23C updates, in accordance with a determination result of presence and absence of an overlap between the detection regions R of frames, "score" of each of the detection regions R in the detection information 33C, and changes the corresponding "state". The determination unit 23C determines, in accordance with both of the "state" and the "score" of the detection region R in the detection information 33C, "fix of adhesion" of the extraneous matter. This point will be mentioned later more specifically with reference to FIGS. 17A to 17D.

Returning FIG. 16B, the item of "ease" will be explained. The item of "ease" stores therein flag values that indicate whether or not a present detection condition for each of the detection region R is to be eased. The example illustrated in FIG. 16B indicates that the detection region R having a detection area ID "xx2", which is check marked in the item of "ease", is to be extracted by a second condition (see FIG. 14B) that is easier than a first condition. The above-mentioned extraction unit 22Ca of the detection unit 22C extracts, by using not the first condition but the second condition, the detection region R having this detection area ID "xx2". This point will be mentioned later also with reference to FIG. 18.

Figure 17A:
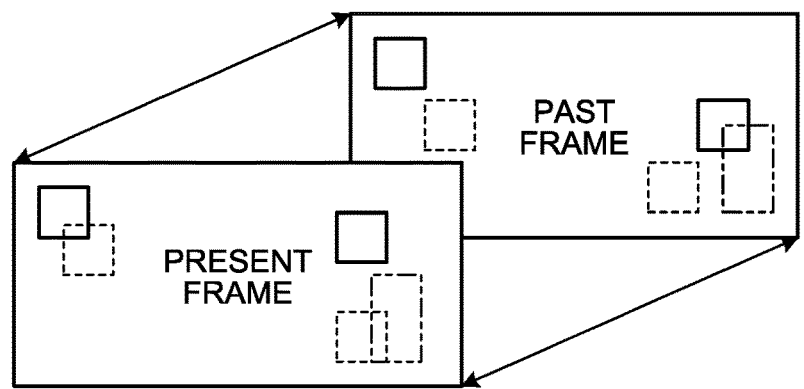
FIGS. 17A to 17D are diagrams illustrating a process to be executed by a determination unit.

Subsequently, the determination process to be executed by the determination unit 23C will be explained more specifically. As illustrated in FIG. 17A, the determination unit 23C determines, for all of the extracted detection regions R determined to include extraneous matters in a present frame, presence and absence of an overlap with the detection regions R that have been already extracted in a past frame.

Figure 17B:
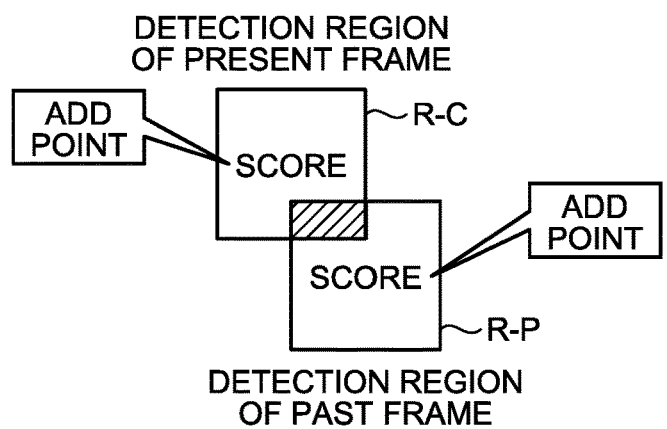

Specifically, as illustrated in FIG. 17B, one or more overlaps between all of detection regions R-C in a present frame and all of detection regions R-P in a past frame are determined. For example, an overlap between the detection region R-C and the detection region R-P is determined on the basis of a distance between gravity centers of the detection region R-C and the detection region R-P.

As illustrated in FIG. 17B, when determining that there presents an overlap between the detection region R-C in a present frame and the detection region R-P of a past frame, the determination unit 23C adds points to scores of the detection region R-C and the detection region R-P.

Thus, the determination unit 23C is capable of indicating an extraneous matter that presents, through the frames, in a similar region of a lens, for example. The addition of points is to add, for example, twenty points ("+20").

Figure 17C:
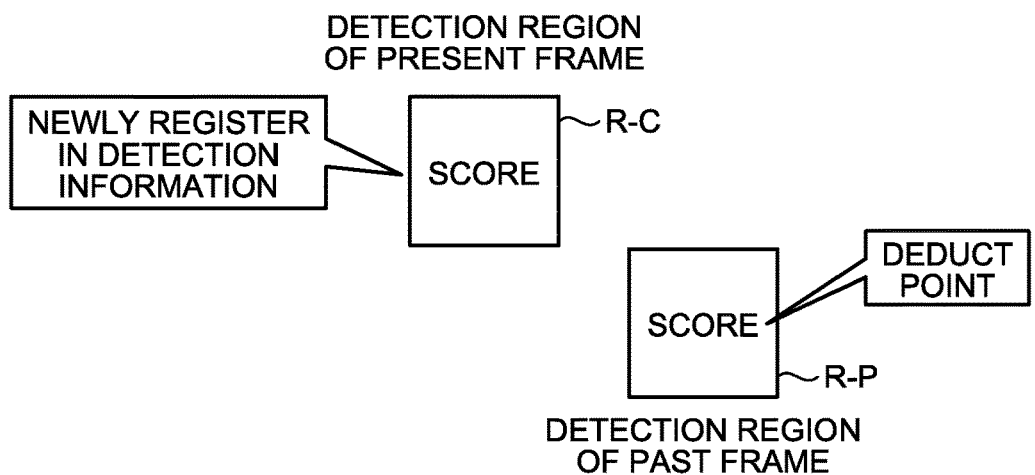

Meanwhile, as illustrated in FIG. 17C, the determination unit 23C reduces points of the detection region R-P and the detection region R-C when there presents no overlap between the detection region R-P of a past frame and the detection region R-C of a present frame. The reduction of points is to subtract, for example, ten points ("−10").

The determination unit 23C newly registers in the detection information 33C, as a new detection region R, the detection region R-C of the present frame that has no overlap with the detection region R-P of the past frame.

Figure 17D:
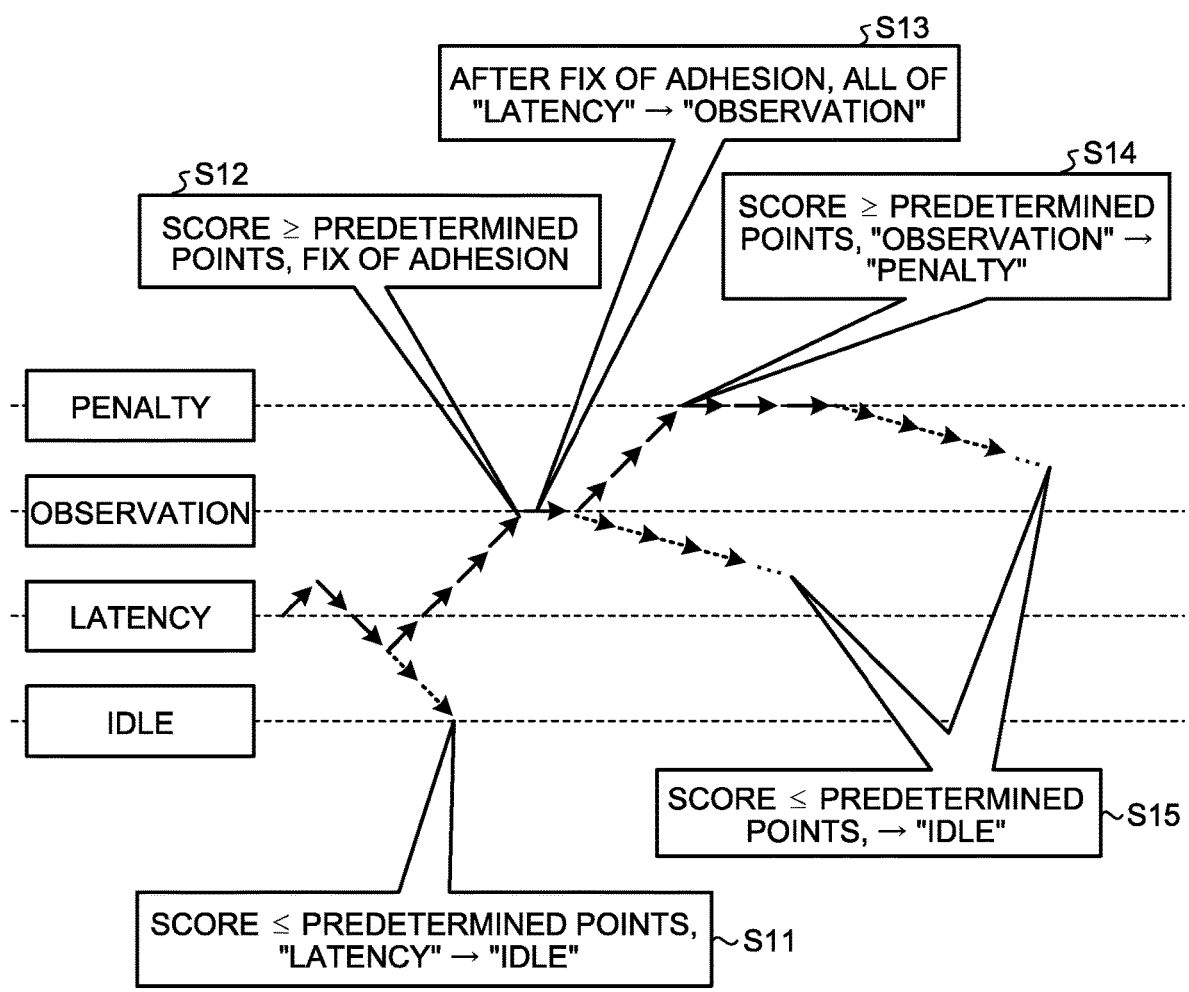

As illustrated in FIG. 17D, the newly registered detection region R becomes a "latency" state, and is given predetermined points. The determination unit 23C changes the state of the detection region R in accordance with a score of the detection region R that is changed from this "latency" state through the above-mentioned "adding points" or "reducing points".

For example, as illustrated in FIG. 17D, when the score of the detection region R that is in a "latency" state is equal to or less than predetermined points, the determination unit 23C changes the state of the detection region R from "latency" into "IDLE" (Step S11). Thus, it is possible to prevent erroneous detection of an extraneous matter such as a raindrop that moves (for example, flows down) and is needed to be fixed for an extraneous matter.

When the score of the detection region R that is in a "latency" state is equal to or more than the predetermined points, the determination unit 23C fixes (fix of adhesion) adhesion of an extraneous matter to a corresponding area (Step S12). For example, when the score becomes equal to or more than "100" points, the determination unit 23C decides a fix of adhesion of the corresponding area.

After the fix of adhesion, the determination unit 23C changes all of the detection regions R that are in a "latency" state into an "observation" state (Step S13). This is because, if the above-mentioned removal process of the extraneous-matter removing apparatus is executed in accordance with a fix of adhesion of the one detection region R, an extraneous matter of the other detection region R, which is in a "latency" state and whose adhesion has not yet been fixed, is usually estimated to be removed.

When the extraneous-matter removing apparatus executes the removal process and the score of the detection region R that is in an "observation" state is equal to or more than the predetermined points, the determination unit 23C changes a state of the detection region R into a "penalty" state (Step S14). Thus, it is possible to grasp a removal failure or an erroneous detection in which an extraneous matter has been continuously detected after a removal process.

When the score of the detection region R that is in an "observation" state or a "penalty" state equal to or less than predetermined points, the determination unit 23C changes the state of the detection region R into an "IDLE" state (Step S15).

The gradients of arrows indicating "adding points" and "reducing points" in FIG. 17D may be adjusted so as to control a response speed to a fix of adhesion. For example, when adding amount and reducing amount of points are increased to increase the gradients of above-mentioned arrows, it is possible to increase the response speed to the fix of adhesion.

When there is the detection region R whose adhesion has been fixed, the determination unit 23C causes the instruction unit 24C to transmit a position of this detection region R to the parking controller 16.

The determination unit 23C stores, in the item of "ease" of the detection information 33C, a flag value indicating the fact that a detection condition of the detection region R, extracted from at least a present frame and being in a "latency" state but not having reached a fix of adhesion, is to be eased (see FIG. 16B). The determination unit 23C informs the above-mentioned detection unit 22C of the detection region R whose detection condition is to be eased. In other words, the determination unit 23C feeds back, to the detection unit 22C, the detection region R that has once been detected as a region in which an extraneous matter presents, so as to carry over this detection region R into a temporally continuous frame (see FIG. 14B).

Figure 18:
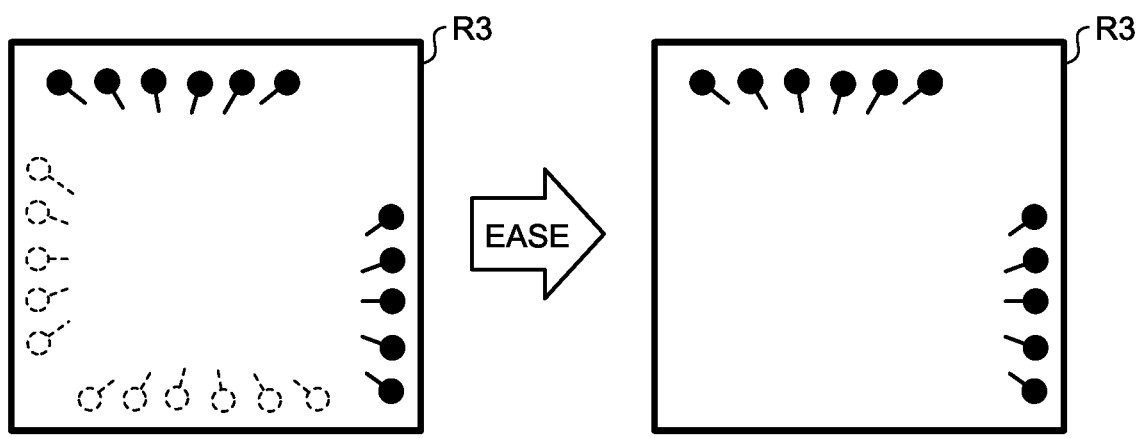
FIG. 18 is a diagram illustrating a fed-back process to be executed by the detection unit.

The detection unit 22C executes, on the basis of the detection information 33C, a detection process, whose detection condition is eased, on the detection region R that is fed back from the determination unit 23C. FIG. 18 is a diagram illustrating a fed-back process to be executed by the detection unit 22C.

FIG. 18 is corresponding to the detection region R3 that is illustrated in the lowest part of FIG. 11, as illustrated in a left part of FIG. 18, for example, when a lower-side pattern or a left-side pattern is further extracted from the detection region R3, the extraction unit 22Ca of the detection unit 22C extracts the detection region R3 as an area in which a water droplet is estimated to be present. In other words, the extraction unit 22Ca extracts the detection region R, in which a water droplet is estimated to be present, by using a direction condition under which patterns indicating sides in different three or more directions are extracted. The direction condition in this case is the "first condition" (see FIG. 14B).

On the other hand, as illustrated in a right part of FIG. 18, after the above-mentioned feedback, the extraction unit 22Ca of the detection unit 22C extracts the detection region R, in which a water droplet is estimated to be present, by using a direction condition under which patterns indicating sides in different two or more directions, such as an upper-side pattern and a right-side pattern, are extracted. In other words, the detection unit 22C extracts, after the feedback, the detection region R by using the "second condition" that is "easier" than the first condition (see FIG. 14B). For example, the detection unit 22C extracts, by using the "second condition" included in the condition information 32C, the detection region R of which a flag is set on the item of "ease" of the detection information 33C.

Thus, it is possible to eliminate unstableness in detection in a case where an extraneous matter is a water droplet or the like. Therefore, by employing the extraneous-matter detecting apparatus 1 according to the present embodiment, it is possible to reduce detection failure of an extraneous matter.

Moreover, by employing the extraneous-matter detecting apparatus 1C according to the present embodiment, a resource such as the once-detected detection region R is able to be efficiently used in the later process, so that it is possible to not only reduce processing load of the overall system, but also to improve a processing speed and detection accuracy.

Returning to FIG. 15, the instruction unit 24C will be explained. When the determination unit 23C fixes a presence of an extraneous matter, the instruction unit 24C generates an instruction signal that indicates, for the parking controller 16, a position of the extraneous matter, and outputs this instruction signal to the parking controller 16.

Figure 19:
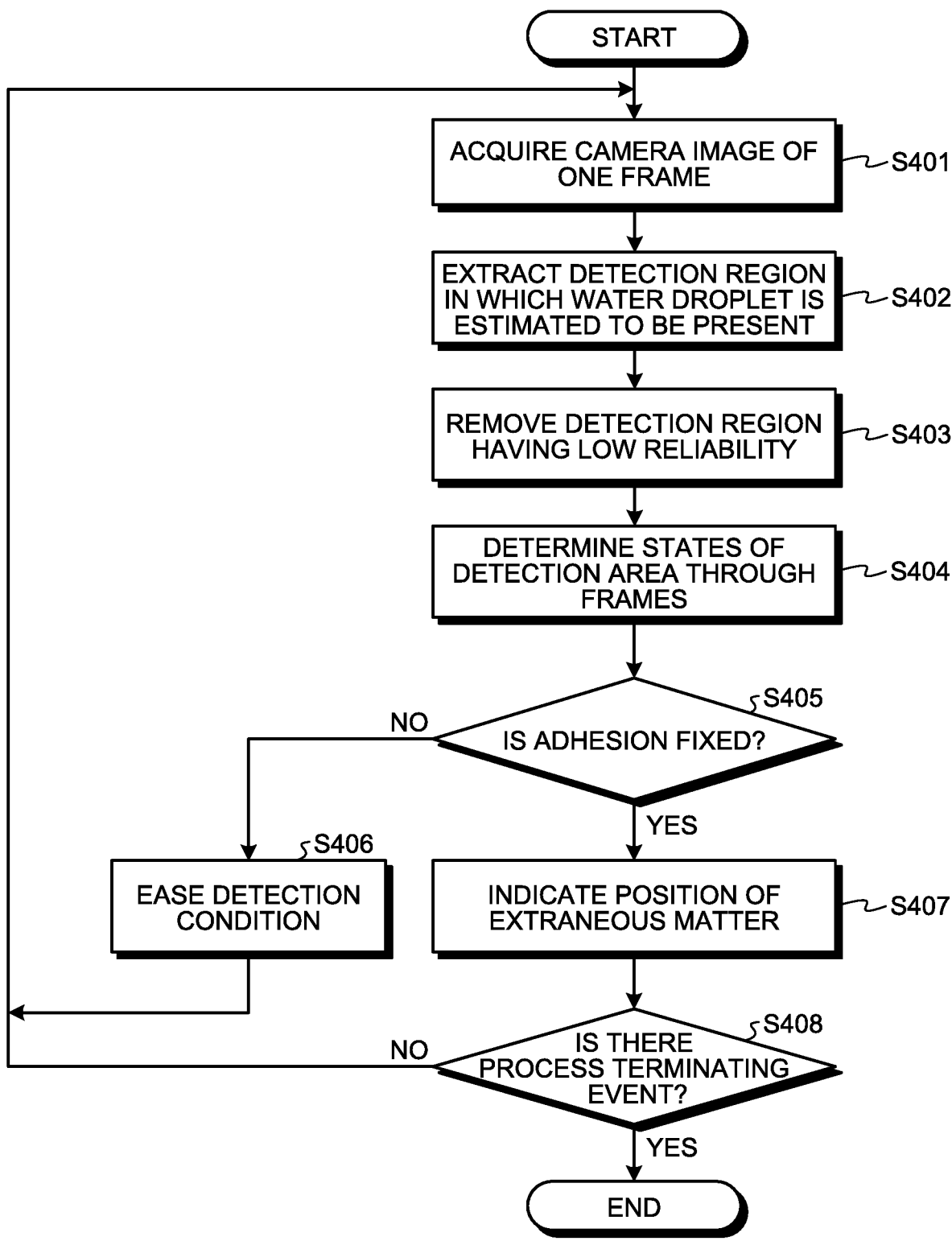
FIG. 19 is a flowchart illustrating a processing procedure to be executed by an extraneous-matter detecting apparatus according to the third embodiment.

Next, a processing procedure to be executed by the extraneous-matter detecting apparatus 1C according to the third embodiment will be explained with reference to FIG. 19. FIG. 19 is a flowchart illustrating the processing procedure to be executed by the extraneous-matter detecting apparatus 1 according to the third embodiment.

The acquisition unit 21C acquires a camera image of one frame (Step S401). The extraction unit 22Ca of the detection unit 22C extracts a detection region in which a water droplet is estimated to be present (Step S402).

The removal unit 22Cb of the detection unit 22C removes a detection region having a low reliability (Step S403).

For example, this removal process may be omitted. Thus, it is possible to reduce processing load of the overall system.

Subsequently, the determination unit 23C determines states of a detection area through frames (Step S404). In other words, the determination unit 23C determines presence and absence of an overlap with the detection regions R that have been already extracted in a past frame, and updates a score and a state of each of the detection regions R in accordance with the determination result.

The determination unit 23C determines, in accordance with the updated scores and states of the detection regions R, whether or not adhesion of each of the detection regions R is fixed (Step S405). When the adhesion is not fixed (Step S405: No), the determination unit 23C sets a flag of an item of "ease" of the corresponding detection region R in the detection information 33C, so as to ease a detection condition (Step S406). The processing is repeated from Step S401.

On the other hand, when adhesion is fixed (Step S405: Yes), the instruction unit 24C transmits, to the parking controller 16, a position of the extraneous matter (Step S407).

The control unit 2 determines whether or not there presents a process terminating event (Step S408). The process terminating event includes, for example, a turning OFF of the ignition (IG-OFF) or a turning OFF of the accessory power source (ACC-OFF). When the control unit 2 determines that there presents no process terminating event (Step S408: No), the processing is repeated from Step S401. When the control unit 2 determines that there presents a process terminating event (Step S408: Yes), the extraneous-matter detecting apparatus 1 ends the processing.

Figure 20A:
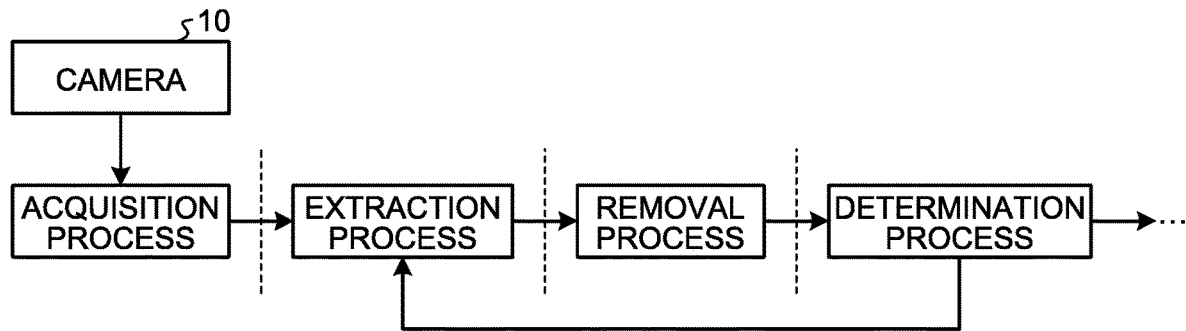
FIG. 20A is a diagram illustrating a flow of a process according to the third embodiment.
Figure 20B:
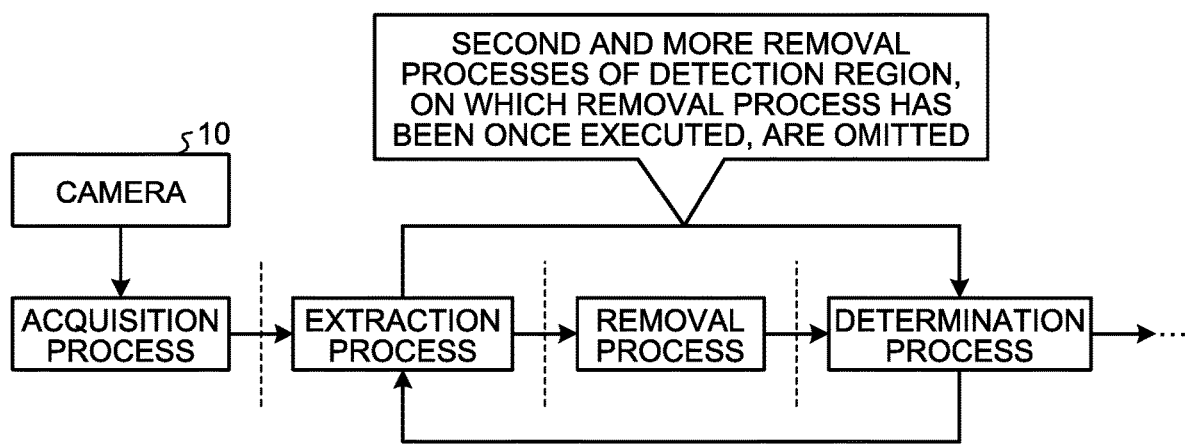
FIG. 20B is a diagram illustrating a flow of a process according to a first modification.
Figure 20C:
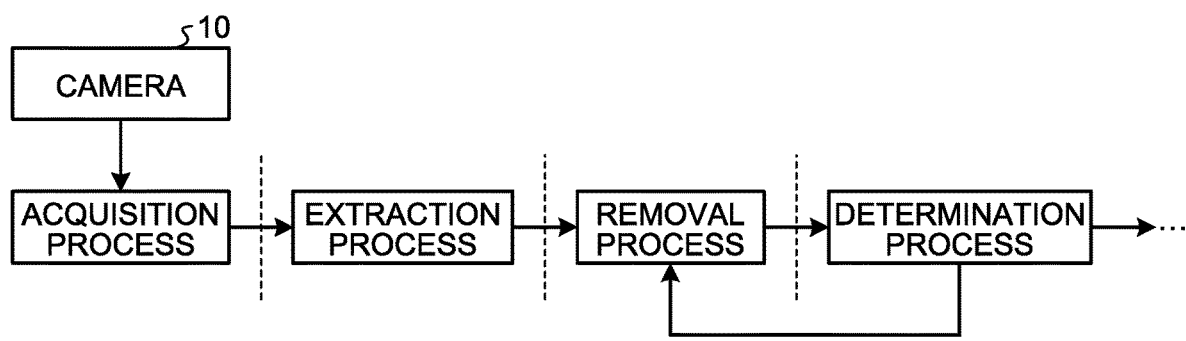
FIG. 20C is a diagram illustrating a flow of a process according to a second modification.

Next, modifications of a flow of the process according to the present embodiment will be explained with reference to FIGS. 20A to 20C. FIG. 20A is a diagram illustrating a flow of the process according to the present embodiment. FIG. 20B is a diagram illustrating a flow of a process according to a first modification. FIG. 20C is a diagram illustrating a flow of a process according to a second modification.

As illustrated in FIG. 20A, the case has been explained above in which the acquisition unit 21C of the extraneous-matter detecting apparatus 1C executes, on the basis of a camera image captured by the camera 10, the acquisition process; the extraction unit 22Ca of the detection unit 22C executes the extraction process; the removal unit 22Cb of the detection unit 22C executes the removal process; and the determination unit 23C executes the determination process. Furthermore, the case has been explained above in which the determination unit 23C feeds back the detection region R before a fix of adhesion (for example, "latency" state in above-mentioned example) in order to carry over the fedback detection region R into a temporally continuous extraction process while easing its detection condition.

However, the flow of the processing is not limited to this example. For example, as illustrated in FIG. 20B, the flow of the processing may be controlled so that the second and more removal processes of the detection region R, on which the removal process has been once executed, which is fed back from the determination process to the extraction process is omitted.

This is because the reliability of the detection region R, on which the removal process has been executed at least once, is estimated to be not low. Thus, it is possible to reduce processing load needed for the removal process so as to reduce processing load of the overall system.

For example, as illustrated in FIG. 20C, the flow of the processing may be controlled so that a loop is closed between the removal process and the determination process without feeding back, to the extraction process, the detection region R that is detected through the extraction process and the removal process.

This is based on an idea that the detection region R, detected at least once through the extraction process and the removal process, does not immediately become absence. In other words, in this case, the once detected detection region R is not repeatedly extracted by using the detection algorism in the extraction process, and a state of the detection region R is to be managed by repeated process between the removal process and the determination process. Thus, it is possible to reduce processing load needed for the extraction process, and to reduce processing load of the overall system.

As described above, the extraneous-matter detecting apparatus 1C includes the detection unit 22C and the determination unit 23C. The detection unit 22C detects, on the basis of a predetermined first condition, a position in a camera image of an extraneous matter adhering to the camera 10 (one example of "image capturing device"). The determination unit 23C determines, on the basis of information on the position detected a plurality of times, presence and absence of an extraneous matter at this position. When the detection unit 22C detects the position, the determination unit 23C causes the detection unit 22C to detect the position on the basis of a second condition that is easier than the first condition.

Therefore, by employing the extraneous-matter detecting apparatus 1C according to the present embodiment, it is possible to reduce detection failure of an extraneous matter. Moreover, the position that is detected under the first condition is to be thereafter detected under the second condition that is easier than the first condition, and thus it is possible to reduce processing load of the overall system and to improve a processing speed while keeping detection accuracy.

The determination unit 23C determines, on the basis of a state transition of the position that is detected the plurality of times, presence and absence of an extraneous matter at this position.

Therefore, by employing the extraneous-matter detecting apparatus 1C, it is possible to determine presence and absence of an extraneous matter with high accuracy without needlessly fixing adhesion of an extraneous matter that is temporarily detected.

The determination unit 23C increases a score that indicates a state of this position when the position is detected by the detection unit 22C, and reduces the score when the position is not detected by the detection unit 22C, so as to manage the state transition; and fixes an adhesion of an extraneous matter to the position when the score is equal to or more than predetermined points.

Therefore, by employing the extraneous-matter detecting apparatus 1C, it is possible to manage the state transition of the position and to determine a fix of adhesion according to the state, by using a simple method.

The detection unit 22C converts, on the basis of edge information that is extracted from pixels in a camera image, the pixels into a predetermined data format, and detects the position on the basis of a matching result between the pixels converted into the data format and a template of the data format that indicates an extraneous matter.

Therefore, by employing the extraneous-matter detecting apparatus 1C, it is possible to detect various extraneous matters in accordance with a template indicating a feature of an extraneous matter.

The detection unit 22C detects the position as the detection region R (one example of "detection region") having a rectangular shape that includes therein an extraneous matter or that is included in an extraneous matter; and detects the position by using, as a first condition, a case where sides indicating different three or more directions are extracted from sides of the detection region R by a template, and by using, as a second condition, a case where sides indicating different two or more directions are extracted from the sides of the detection region R by a template.

Therefore, by employing the extraneous-matter detecting apparatus 1C, the rectangle-shaped detection region R is used, so that it is possible to detect an extraneous matter by a simple method. The detection region R, detected under the first condition, is detected thereafter under the second condition that is easier than the first condition, so that it is possible to reduce processing load of the overall system and to improve a processing speed while keeping the detection accuracy.

The camera 10 is provided in a vehicle. The vehicle includes the parking controller 16 (one example of "parking controlling unit") that executes, on the basis of a camera image of the camera 10, parking control on the vehicle. The parking controller 16 stops the parking control over the vehicle when the determination unit 23C fixes an adhesion of an extraneous matter in the position. Therefore, by employing the automatic parking system S, it is possible to realize an automatic parking system having a high safety.

In the above-mentioned embodiment, the case is exemplified in which the extraction unit 22Ca extracts the detection region R by using predetermined detection algorism that is based on an edge intensity of each pixel; however, the extraction unit 22Ca may execute in parallel therewith different detection algorism. As detection algorism that is based on an element other than the edge intensity, there is exemplified, for example, algorism that extracts, as edge information, a luminance gradient and a gradient of a chromatic value of each pixel so as to extract the detection region R on the basis of the extracted edge information.

When the extraction unit 22Ca executes detection algorism in parallel, the removal unit 22Cb executes a removal process on a processing result of each detection algorism. The determination unit 23C may determine an overlap between pieces of the algorism before the above-mentioned determination of an overlap through frames.

Fourth Embodiment

Figure 21:
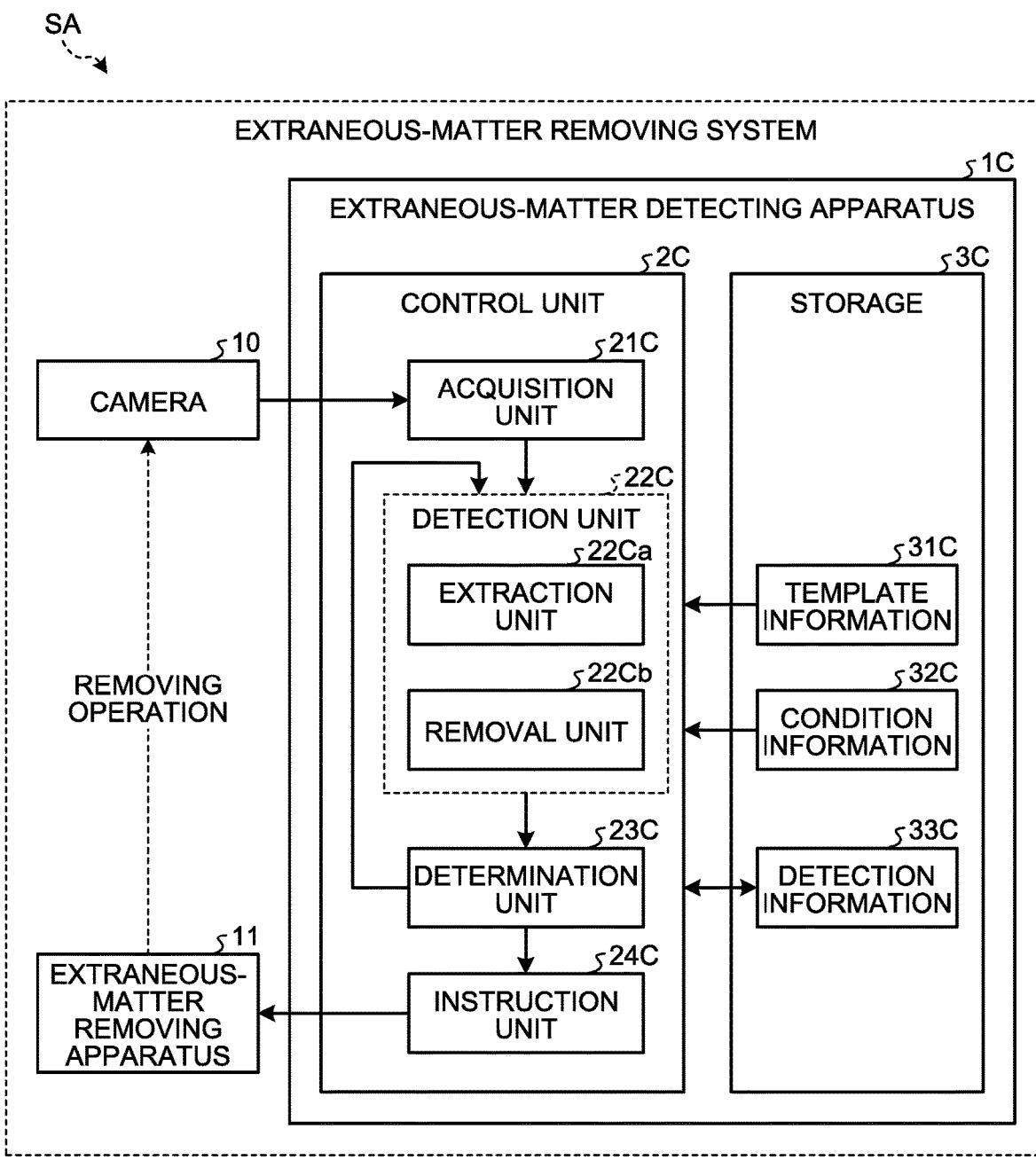
FIG. 21 is a block diagram illustrating an extraneous-matter removing system according to a fourth embodiment.

Next, a fourth embodiment will be explained with reference to FIG. 21. FIG. 21 is a block diagram illustrating an extraneous-matter removing system SA according to the fourth embodiment. The extraneous-matter removing system SA illustrated in FIG. 21 corresponds to the automatic parking system S illustrated in FIG. 15, and a different point therebetween is that the extraneous-matter removing system SA includes the extraneous-matter removing apparatus 11 instead of the parking controller that is 16 included in the automatic parking system S.

In the extraneous-matter removing system SA, when there is the detection region R whose adhesion is fixed, the determination unit 23C causes the instruction unit 24C to transmit, to the extraneous-matter removing apparatus 11, an instruction for performing a removing operation. The determination unit 23C may perform no removing operation even when there is the detection region R whose adhesion is fixed.

For example, when the detection region R, whose adhesion is fixed, is located in a region along an outer periphery of a screen, which does not interfere with visual recognition of a camera image, the determination unit 23C is able to determine that a removal process is not needed to be performed. For example, when the number of the detection regions R whose adhesion is fixed is less than a predetermined number, the determination unit 23C is able to determine that a removal process is not needed to be performed.

As described above, a removal process may be omitted for an extraneous matter that is determined to have less effect on visual recognition or driving operation of an occupant, so that it is possible to reduce processing load of the overall system.

When the determination unit 23C determines that an extraneous matter is needed to be removed, the instruction unit 24C generates an instruction signal for causing the extraneous-matter removing apparatus 11 to perform a removing operation, and outputs this instruction signal to the extraneous-matter removing apparatus 11. In other words, taking the extraneous-matter detecting apparatus illustrated in FIG. 10 for an example, in the second embodiment, the instruction unit 24C does not "indicate a position of an extraneous matter" of Step S107, but causes the extraneous-matter removing apparatus 11 "to perform a removing operation". The extraneous-matter removing apparatus 11 executes the removing operation on the basis of this instruction so as to remove an extraneous matter.

Therefore, by employing the extraneous-matter removing system SA including the extraneous-matter detecting apparatus 1 according to the present embodiment, it is possible not only to detect an extraneous matter while reducing detection failure, but also to remove the detected extraneous matter by using the extraneous-matter removing apparatus 11.

In the above-mentioned embodiments, the case is exemplified in which the extraneous-matter detecting apparatus 1 is employed for the on-vehicle camera 10; however, the extraneous-matter detecting apparatus 1 may be employed for a camera having another type, such as a monitor/security camera that is set inside/outside of a building, set on a road, or the like.

In the above-mentioned embodiments, the case is exemplified in which the extraneous-matter detecting apparatus 1 detects a water droplet as an extraneous matter; however, not limited thereto. In other words, another extraneous matter instead of a water droplet may be detected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An extraneous-matter detecting apparatus comprising:
a first extraction unit that extracts a first pixel group of first pixels included in a captured image captured by an image capturing device, each of the first pixels having a luminance gradient directed outward from a predetermined center region;
a second extraction unit that extracts a second pixel group of second pixels included in the captured image, each of the second pixels having a luminance gradient directed inward toward the predetermined center region; and a detection unit that combines the first pixel group, extracted by the first extraction unit, and the second pixel group, extracted by the second extraction unit, with each other so as to detect an extraneous matter adhered to the image capturing device.

2. The extraneous-matter detecting apparatus according to claim 1, wherein
the detection unit includes:
a generation unit that integrates a first region and a second region to generate an integrated region, the first region extending from the first pixel group toward the predetermined center region, and the second region extending from the second pixel group toward the predetermined center region; and
a decision unit that decides, based on a combination of the first pixel group and the second pixel group that constitute the integrated region generated by the generation unit, the integrated region to be the extraneous matter.

3. The extraneous-matter detecting apparatus according to claim 2, wherein
the generation unit further integrates first regions or second regions to generate an integrated region, and
when integrating the first region and the second region to generate the integrated region, the generation unit makes an integration condition tighter than a case when integrating the first regions with each other or integrating the second regions with each other to generate the integrated region.

4. The extraneous-matter detecting apparatus according to claim 2, wherein
the generation unit further integrates first regions or second regions to generate an integrated region, and
the decision unit makes a decision condition for deciding an extraneous matter tighter in the integrated region that is generated by integrating the first region and the second region than in the integrated region that is generated by integrating the first regions with each other or integrating the second regions with each other.

5. The extraneous-matter detecting apparatus according to claim 2, wherein
the generation unit further integrates first regions or second regions to generate an integrated region,
the extraneous-matter detecting apparatus is further comprising:
a fixing unit that fixes, based on an time-dependent overlap between integrated regions integrated by generation unit that is decided to be an extraneous matter by the decision unit, a presence of the extraneous matter, and
the fixing unit more reduces weighting for the integrated region generated by integrating the first region and second region than for the integrated region that is generated by integrating the first regions with each other or generated by integrating the second regions with each other.

6. The extraneous-matter detecting apparatus according to claim 5, wherein
the image capturing device is provided in a vehicle,
the vehicle includes a parking controlling unit that performs, based on the captured image, parking control on the vehicle, and
when the fixing unit fixes a presence of an extraneous matter, the parking controlling unit stops the parking control over the vehicle.

7. An extraneous-matter detecting method to be executed by a computer, the method comprising:
first extracting a first pixel group of first pixels included in a captured image captured by an image capturing device, each of the first pixels having a luminance gradient directed outward from a predetermined center region;
second extracting a second pixel group of second pixels included in the captured image, each of the second pixels having a luminance gradient directed inward toward the predetermined center region; and
combining the first pixel group, extracted in the first extracting, and the second pixel group, extracted in the second extracting, with each other so as to detect an extraneous matter adhered to the image capturing device.

8. An extraneous-matter detecting apparatus comprising:
a search unit that searches a captured image, captured by an image capturing device, for a first pixel group and a second pixel group, the first pixel group having a luminance that radially changes in a first direction with respect to a predetermined center region, and the second pixel group having a luminance radially changes in a second direction reverse to the first direction; and
a detection unit that detects, when the search unit extracts an array constituted of the first pixel group and the second pixel group existing on both ends of the first pixel group, a water droplet adhered to the image capturing device.

9. The extraneous-matter detecting apparatus according to claim 8, wherein
when the search unit extracts, from the captured image, a plurality of arrays on one side of a rectangular detection region with respect to the center region, the detection unit detects the water droplet in the detection region.

10. The extraneous-matter detecting apparatus according to claim 9, wherein
when a length of the second pixel group with respect to the first pixel group is equal to or more than a predetermined value, the search unit removes a whole or a part of the second pixel group.

11. The extraneous-matter detecting apparatus according to claim 9, wherein
when searching, for the first pixel group and the second pixel group, each of sides of the rectangular detection region so as to extract the plurality of arrays, the search unit changes, in accordance with a searching position in the captured image, a side to be searched among the sides.

12. The extraneous-matter detecting apparatus according to claim 9, wherein
when the search unit extracts a pixel group other than the arrays, the detection unit detects the detection region having one side that is based on a length of the pixel group extracted by the search unit, and when at least a part of the detection region overlaps with another detection region, the detection unit further integrates both of the detection regions with each other.

13. The extraneous-matter detecting apparatus according to claim 8, wherein
the image capturing device is provided in a vehicle,
the vehicle includes a parking controlling unit that performs, based on the captured image, parking control on the vehicle, and
when the detection unit detects an adhesion of the water droplet to the image capturing device, the parking controlling unit stops the parking control over the vehicle.

14. An extraneous-matter detecting method to be executed by a computer, the method comprising:
- searching a captured image, captured by an image capturing device, for a first pixel group and a second pixel group, the first pixel group having a luminance that radially changes in a first direction with respect to a predetermined center region, and the second pixel group having a luminance radially changes in a second direction reverse to the first direction with respect to the predetermined center region; and
- determining that an array constituted of the first pixel group and the second pixel group existing on both ends of the first pixel group are extracted in the searching, and detecting a water droplet adhered to the image capturing device.

* * * * *